（12） United States Patent
Lee

(10) Patent No.: US 10,628,343 B2
(45) Date of Patent: Apr. 21, 2020

(54) SYSTEMS AND METHODS FOR UTILIZING DDR$_4$-DRAM CHIPS IN HYBRID DDR$_5$-DIMMS AND FOR CASCADING DDR$_5$-DIMMS

(71) Applicant: Futurewei Technologies, Inc., Plano, TX (US)

(72) Inventor: Xiaobing Lee, Santa Clara, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 263 days.

(21) Appl. No.: 15/424,638

(22) Filed: Feb. 3, 2017

(65) Prior Publication Data

US 2018/0225235 A1   Aug. 9, 2018

(51) Int. Cl.
*G06F 13/16* (2006.01)
*G06F 11/10* (2006.01)
*G06F 13/40* (2006.01)

(52) U.S. Cl.
CPC ...... *G06F 13/1673* (2013.01); *G06F 11/1044* (2013.01); *G06F 11/1048* (2013.01); *G06F 13/4068* (2013.01)

(58) Field of Classification Search
CPC ............. G06F 11/1044; G06F 13/1673; G06F 13/4068
See application file for complete search history.

(56) References Cited

U.S. PATENT DOCUMENTS

| | | | |
|---|---|---|---|
| 2009/0168587 A1 | 7/2009 | Kim et al. | |
| 2013/0275682 A1 | 10/2013 | Ramanujan et al. | |
| 2015/0098282 A1 | 4/2015 | Lee | |
| 2015/0254003 A1 | 9/2015 | Lee et al. | |
| 2015/0255130 A1 | 9/2015 | Lee et al. | |
| 2015/0262633 A1* | 9/2015 | Lee | G11C 7/1075 710/308 |
| 2016/0232112 A1* | 8/2016 | Lee | G06F 13/1673 |
| 2017/0322726 A1* | 11/2017 | Walker | G06F 13/1626 |
| 2018/0181504 A1* | 6/2018 | Morris | G06F 13/1689 |

FOREIGN PATENT DOCUMENTS

CN    103946826 A    7/2014

* cited by examiner

*Primary Examiner* — Eric T Oberly
(74) *Attorney, Agent, or Firm* — Slater Matsil, LLP

(57) ABSTRACT

A hybrid DDR5 DIMM device includes a PCB board with a host interface through one of two DDR5 sub-channels, and a plurality of DDR4 or slow DDR5 SDRAM chips on the PCB coupled to this single channel DDR5 host interface. An embodiment processing system includes a host CPU to access one or more pairs of hybrid DDR5 DIMM devices for 4×DDR5 memory capacities (4DPC), a first or second hybrid DDR5 DIMM including a plurality of half-speed SDRAM chips, and a first or second DDR5 sub-channel coupled the host with slow SRAM chips on DIMM. Mounting same data-buffer and RCD chips on hybrid DIMM to a server motherboard can double available DDR4 DIMMs' speed to DDR5 speed rate. Pairs of hybrid DDR5 DIMM devices cascaded one-by-one can aggregate more DDR5 DIMM devices to expand memory capacities at double speed of DDR4 or DDR5 SDRAM chips, beyond current DDR5 speed limit 6400 MT/s.

30 Claims, 19 Drawing Sheets

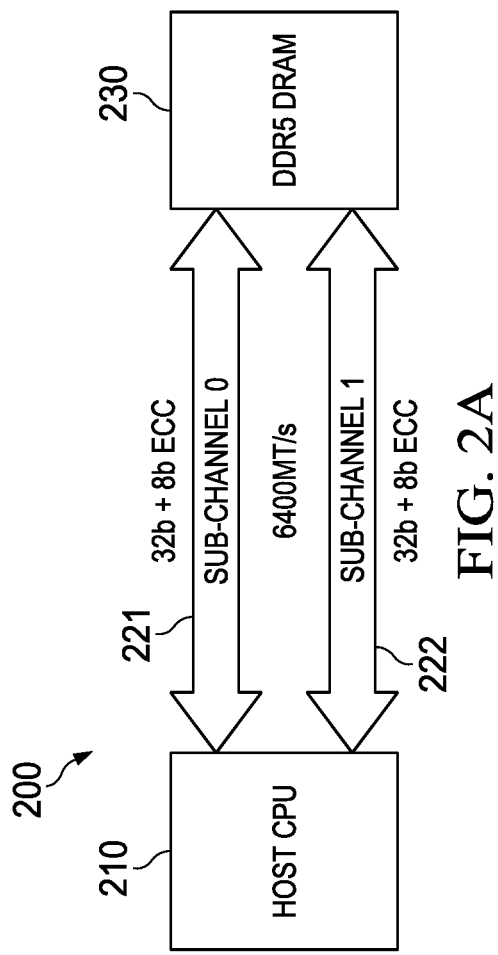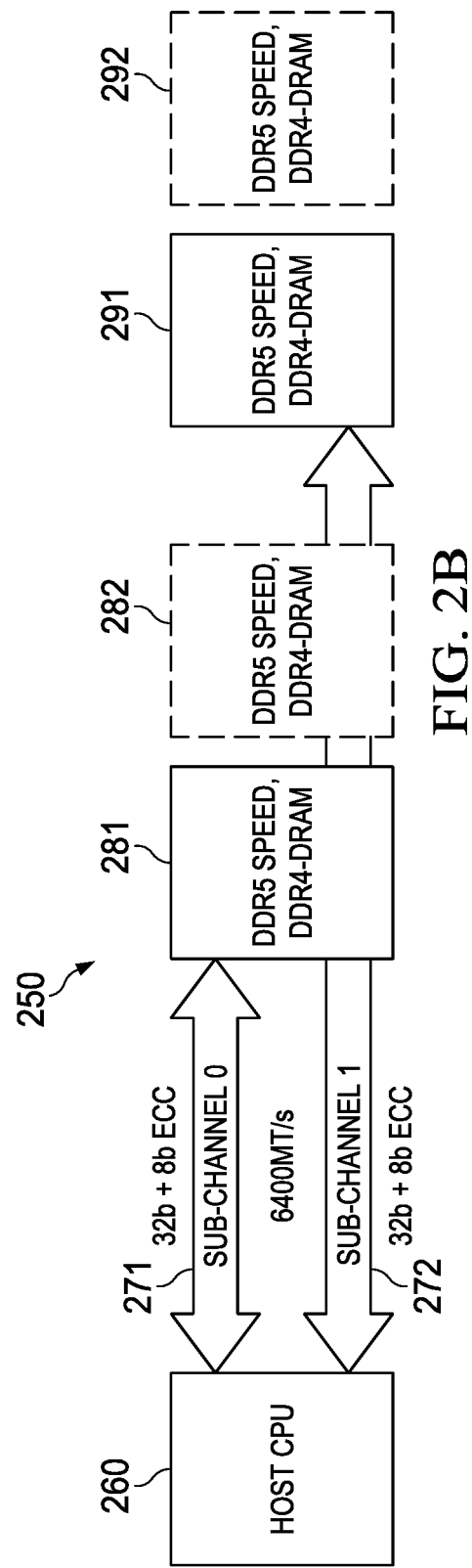

| OP CODES | MODE | OPERATIONAL FUNCTIONS |
|---|---|---|
| 0, 0, 0 | BY-PASS | TWO NORMAL DDR5 DATA BUFFERS |
| 0, 1, 0/1 | DDR5-4 | DDR5-TO-DDR4 RATE DOUBLERS BY PORT 0/1 |
| 1, 0, 0/1 | DDR5-5 | DDR5 RATE/CAPACITY DOUBLERS BY PORT 0/1 |
| 1, 1, 0/1 | CASCADE | PORT 0/1 TO HOST, PORT 1/0 TO NEXT DIMM |

SYSTEMS AND METHODS FOR UTILIZING DDR$_4$-DRAM CHIPS IN HYBRID DDR$_5$-DIMMS AND FOR CASCADING DDR$_5$-DIMMS

TECHNICAL FIELD

The present invention relates generally to systems and methods for dynamic random access memory, and, in particular embodiments, to systems and methods for utilizing DDR4-DRAM chips in hybrid DDR5-DIMMs and for cascading DDR5-DIMMs to expand capacities.

BACKGROUND

The current double data rate (DDR) synchronous dynamic random access memory (SDRAM) (also referred to as DRAM) standard is for DDR4 memory, and provides a channel that can support dual-in-line memory module (DIMM) devices at a maximum speed rate of 1600 MHz or 3200 mega-transactions (MT)/second (s) clocking data on both rising and falling clock edges, and next generation DDR5 memories will be up to 6400 MT/s maximum speed. Generally, however, no related DIMM devices operating at the 3200 MT/s speed have been introduced yet, even though DDR4-SDRAM chips are available with a 3200 MT/s speed rate. This is primarily because DDR4 could only support a single DIMM device on the bus at the 3200 MT/s speed. This limits the memory capacity at higher speeds to one third that of slower-speed implementations, e.g., ones running at 2400 MT/s with 3 DIMMs per channel (DPC). Further, currently expensive three dimensional stacked (3DS) DDR4-SDRAM chips are used for high capacity DIMM devices.

The DDR5 bus running in speed rate higher than 4400 MT/s could limit the loading to 1DPC with half numbers of DDR5-SDRAM chips on the DIMM device than at slow speed rate. The graphic DDR5 (GDDR5) and GDDR5X memory standards are used for graphical processing unit (GPU) with dedicated point-to-point graphic memories up to 14 GT/s speed, but they are not used for server DIMM devices.

SUMMARY

In accordance with an embodiment, a hybrid double data rate 5 (DDR5) dual inline memory module (DIMM) includes a printed circuit board (PCB), and an edge connector of the PCB including a DDR5 DIMM external interface to one of the dual DDR5 sub-channels. A plurality of DDR4 synchronous dynamic random access memory (SDRAM) chips are mounted on the PCB and operatively coupled to the DDR5 DIMM external interface.

In accordance with another embodiment, a processing system includes a host central processing unit (CPU), a first hybrid DDR5 DIMM including a first plurality of DDR4 SDRAM chips, and a first DDR5 sub-channel coupled between the host CPU and the first hybrid DDR5 DIMM. The processing system also includes a second hybrid DDR5 DIMM comprising a second plurality of DDR4 SDRAM chips, and a second DDR5 sub-channel coupled between the host CPU and the second hybrid DDR5 DIMM, as 2DPC each at speed rate 4400 MT/s or slower.

In accordance with another embodiment, a method of operating a memory system includes receiving, by a hybrid DDR5 DIMM, data via a first external DDR5 sub-channel, and splitting, on the hybrid DDR5-DIMM, the received data onto a plurality of pairs of DDR4 byte-channels at half of DDR5 speed. The method further includes, for each of the DDR4 byte-channels, storing the split data in a set of slow DDR4 SDRAM chips on the hybrid DDR5-DIMM.

In accordance with another embodiment, a method of operating a DDR5 dual-channels system to access double DIMM devices includes transferring first data via a first DDR5 sub-channel at a first transaction rate to a first set of two hybrid DDR5 DIMM devices including a first plurality of DDR4 SDRAM chips on each DIMM, and transferring second data via a second DDR5 sub-channel at the first transaction rate to a second set of two hybrid DDR5 DIMM devices comprising a second plurality of DDR4 SDRAM chips on each DIMM, for total of four DDR5 DIMM devices with current available slow DDR4-SDRAM chips on them for slow DDR5 speed rates with 4DPC bus loading.

Another embodiment provides a method of manufacturing a hybrid DDR5 DIMM having a DDR5 DIMM host interface for one DDR5 sub-channel on an edge connector of a PCB. The method includes mounting a plurality of data-buffer chips on the PCB, wherein the plurality of data-buffer chips are operatively coupled to the DDR5 DIMM host interface. The method also includes mounting a plurality of DDR4 SDRAM chips on the PCB, the plurality of DDR4 SDRAM chips operatively coupled to the data-buffer chips at half data rate of the host DDR5 speed. The method further includes mounting a register clock driver (RCD) on the PCB, the RCD operatively coupled between the DDR5 DIMM host control bus interface and the plurality of DDR4 SDRAM chips by adapting a DDR5 command/address into one DDR4 command/address or two for handling longer burst data (BL32).

Another embodiment provides a method of enabling current DDR4-DIMM devices aggregating at DDR5 speed rate 6400 MT/s is building the PCB of server motherboard with the same DDR5-to-DDR4 rate-double data-buffer chips and DDR5-to-DDR4 RCD control adapter chips on the hybrid DDR5 DIMM, where the DDR5 host interface to a CPU at various DDR5 speed rates and DDR4 memory interfaces at half speed of DDR5 for accessing multiple standard DDR4-DRAM DIMM devices could aggregate huge capacity of memories to meet future big data processing and high performance computing needs, up to 6400 MT/s speeds while waiting for developments on DDR5 SDRAM chips.

Another embodiment provides a method of accessing more DDR5 DIMM devices at 6400 MT/s or even 8000 MT/s speed is utilizing a cascading switched rate/capacity-double data buffer on the DDR5 DIMM device, where the cascading data buffer chips having two DDR5 host interface ports (8 bits each) and two memory interface ports (8 bit each) with DDR4 mode for low cost DDR4-SDRAM chips or DDR5 mode for doubling slow introduction DDR5-SDRAM chips speed.

In accordance with another embodiment, a cascading switched rate/capacity-double data buffer chip has four basic operation mode, the "normal" mode for standard DDR5-DRAM DIMM device with two bytes of host ports to drive two set of DDR5-SDRAM chips, "DDR5-4" mode to split one DDR5 host port to drive two set of DDR4-SDRAM ships, "DDR5-5" mode to split one DDR5 host port to drive two set of slow DDR5-SDRAM ships, and "cascade" mode for switching one host port (first sub-channel) to the cascading port (second sub-channel) linked with another DDR5 DIMM devices. This DDR5 DIMM cascading scheme does not only break though the original capacity limitation of 1DPC per bus at high speed, but also provide two host CPUs to share the same data without SerDes interconnections between the CPUs.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A is a block diagram illustrating DDR5 dual sub-channels of two 32 bit data and 8 bit ECC at maximum speed rate, in 1DPC bus loading;

FIG. 2B is a block diagram illustrating double DDR5 memory capacity implemented by splitting two DDR5 sub-channels with pairs of low cost hybrid DDR5 DIMM by available DDR4-DRAM chips;

DETAILED DESCRIPTION OF ILLUSTRATIVE EMBODIMENTS

The standard is currently being developed for the next generation of DDR SDRAM, which is DDR5. The DDR5 host-to-memory module interface is 64-bits of data plus 16 bits of error correction code (ECC). It is a dual channel system that a 64-bits data bus is split into two sub-channels of 32 bits of data and 8 bits error correction code each. The sub-channels also include a command/address interface. The DDR5 memory standard generally has a goal of at least doubling the DDR4 maximum speed to reach 6400 MT/s, or even 8000 MT/s. But operating at such high speeds will not be very useful if such operation limits the total memory capacity available to the host, as the DDR4-DIMM running at 3200 MT/s speed currently does.

Various embodiments provide hybrid DDR5-DIMM devices with capacity/speed doubling using slower but interleaved DDR4-DRAM chips. An embodiment maintains the same maximum bus speed and total bus bandwidth of DDR5 dual-channel memory buses as seen by the host central processing unit (CPU). An embodiment doubles the effective capacity and speed for DDR4-DRAMs used in hybrid DDR5 DIMMs. That is, currently-available low-cost DDR4-DRAM chips are used to effectively provide hybrid DDR5-DIMMs with external DDR5 speed and performance.

Figure 1A:
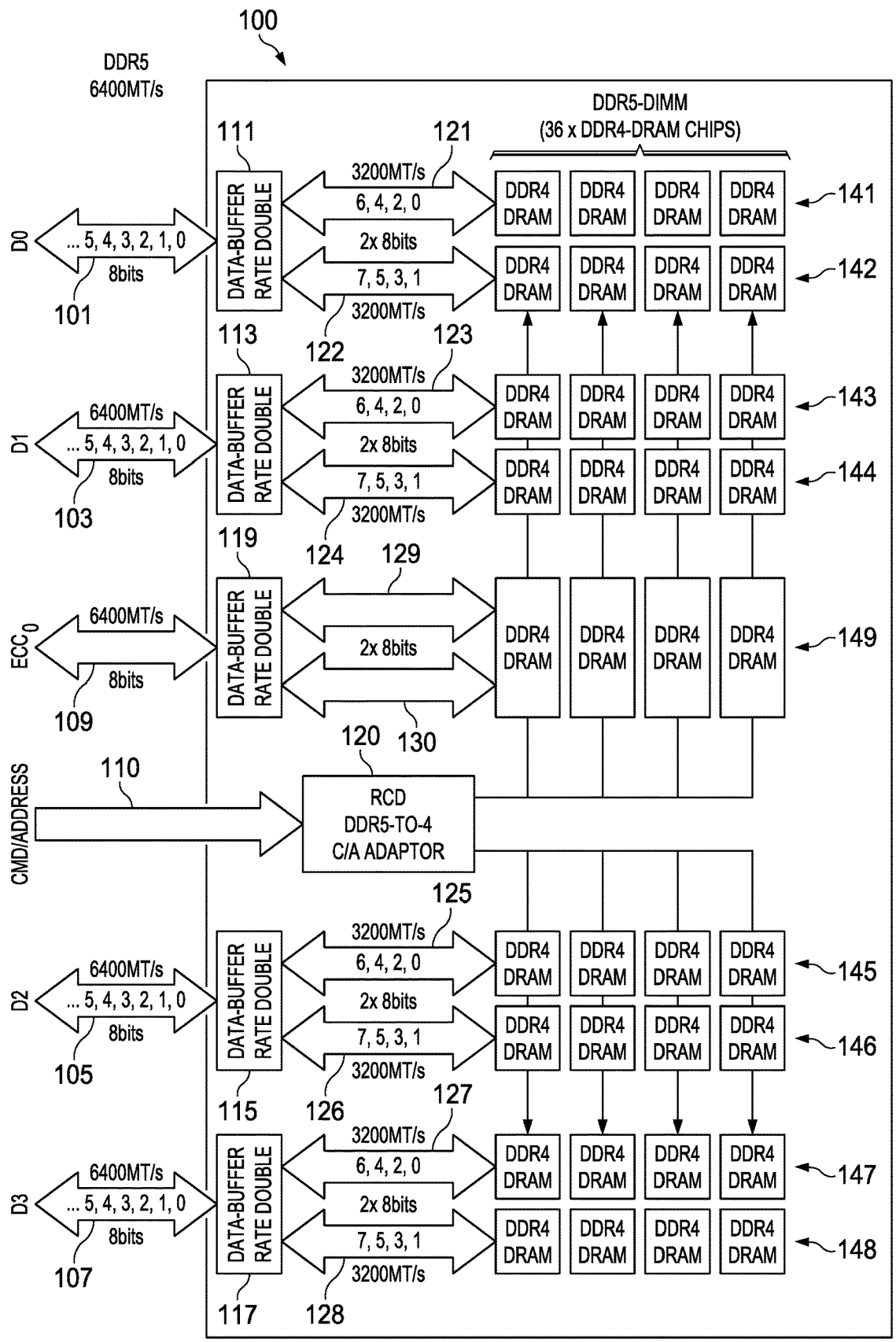
FIG. 1A is a block diagram illustrating a hybrid DDR5-DIMM implemented with speed doubling and DDR4-SDRAM chips.

FIG. 1A is a block diagram illustrating an embodiment hybrid DDR5 DIMM 100 implemented with speed doubling data buffer and DDR4-DRAM chips. As used herein, a hybrid DDR5 DIMM has an external DDR5 sub-channel host interface, but utilizes current DDR4 SDRAMs instead of future DDR5 SDRAMs. From an external perspective, a pair of such devices effectively operates as a DDR5 DIMM. Hybrid DDR5 DIMM 100 includes one DDR5 data sub-channel interface having 32 data bits, illustrated as DDR5 data bytes D0 101, D1 103, D2 105 and D3 107. The DDR5 sub-channel interface further has 8 error correcting code (ECC) bits, illustrated as ECC0 byte 109. The DDR5 sub-channel interface also includes a DDR5 command/address interface no.

Each of the data bytes and the ECC byte is coupled to a respective data-buffer on the hybrid DDR5 DIMM. Specifically, data byte D0 101 is coupled to data-buffer/rate double 111, data byte D1 103 is coupled to data-buffer 113, data byte D2 105 is coupled to data-buffer 115, data byte D3 107 is coupled to data-buffer 117, and ECC byte 109 is coupled to data-buffer 119.

Each of the four data-buffers 111, 113, 115, 117 for the data splits its DDR5 data into two interleaved 8-bit sub-channels at half the transaction rate of the DDR5 host interface. Specifically, data-buffer 111 operates as a first-in first-out (FIFO) to interleave bytes from D0 101 onto DDR4 byte-channelDDR4 byte-channels 121, 122. As shown in FIG. 2A, even bytes 0, 2, 4 and 6 that are clocked by the falling edge of the clock are sent on upper sub-channel 121, and odd bytes 1, 3, 5 and 7 that are clocked by the rising edge of the clock are sent on lower sub-channel 122. Similarly, data-buffer 113 interleaves bytes from D1 103 onto DDR4 byte-channelDDR4 byte-channels 123, 124, data-buffer 115 interleaves bytes from D2 105 onto DDR4 byte-channelDDR4 byte-channels 125, 126, and data-buffer 115 interleaves bytes from D3 105 onto DDR4 byte-channelDDR4 byte-channels 127, 128. With respect to speed, as an example, if the DDR5 sub-channel is operating at 6400

MT/s, the DDR4 byte-channelDDR4 byte-channels on the DIMM operate at half that rate, or 3200 MT/s. As another example, if the DDR5 sub-channel is operating at 4400 MT/s, the DDR4 byte-channels on the DIMM operate at half that rate, or 2200 MT/s or 2400 MT/s (higher speed).

Each of these DDR4 byte-channels drives four DDR4 SDRAM chips at half the DDR5 speed. Specifically, sub-channel 121 drives four DDR4 SDRAM chips 141, sub-channel 122 drives four DDR4 SDRAM chips 142, sub-channel 123 drives four DDR4 SDRAM chips 143, sub-channel 124 drives four DDR4 SDRAM chips 144, sub-channel 125 drives four DDR4 SDRAM chips 145, sub-channel 126 drives four DDR4 SDRAM chips 146, sub-channel 127 drives four DDR4 SDRAM chips 147, and sub-channel 128 drives four DDR4 SDRAM chips 148.

The ECC data-buffer 119 for the ECC data 109 utilizes one of its DDR4 ports to drive one byte-channel 129 coupled to four DDR4 SDRAM chips 149, at half the DDR5 sub-channel speed. The other port/sub-channel 130 of the ECC data-buffer is not used (pull up to save power). The data and ECC therefore need a total of 36 DDR4 SDRAM chips operated as a two rank DIMM device, instead of 40 DDR5 SDRAM chips in smaller packaging in the future.

In more detail, the current DDR4 DIMM board size can only fit 36 DDR4-SDRAM chips, while the proposed DDR5 SDRAM package size will change to a smaller package size, allowing 40 chips to be mounted on the DIMM. Because of the slower DDR4 operating speed compared to DDR5, however, the DDR4 64-bit data plus 8-bit single error detection (SED)-double error detection (DED) ECC expanded from two consecutive DDR5 32 bits data plus 8 bits (ECC byte) sub-channel on the hybrid DDR5-DIMM by 36 DDR4-SDRAM chips should be sufficient at slow speed rate. A DDR5 DIMM running at 6400 MT/s rate introduces more errors on the DDR SDRAM memory channel, so it uses 32-bit data plus 8-bit ECC to protect the data in the host interface. A DDR4 DIMM running at half that rate, @2200 MT/s, is slow enough to allow the use of 64-bit data plus 8-bit ECC (instead of 64-bit plus 16-bit ECC), allowing for a total of 4×9=36 chips of existing DDR4 SDRAM chips.

Register clock driver (RCD) 120, which includes a register clock regenerator and command (CMD)/address buffer, adapts/converts DDR5 commands and addresses from the host CPU, into DDR4 commands and addresses, which are used to control the DDR4 SDRAM chips. The data-buffers are bidirectional, allowing write data to be written to the DDR4 SDRAMs, and read data to be read from the DDR4 SDRAMs, based on the specific commands issued by the host CPU and translated by the RCD 120.

The hybrid DDR5 DIMM may be implemented as a printed circuit board (PCB) with and edge card connector having pins for the 32 bits of data, 8 bits error correction code and the command/address interface of one DDR5 sub-channel. The DDR4 SDRAM chips may be in a variety of integrated circuit package types, such as ball grid array (BGA), quad flat package (QFP), single in-line package (SIP), dual in-line package (DIP), small outline package (SOP), thin small outline package (TSOP), shrink small outline package (SSOP), and the like. The DDR4 SDRAM chips, data-buffer chips and RCD chip are mounted, e.g., soldered, on the PCB.

Figure 1B:
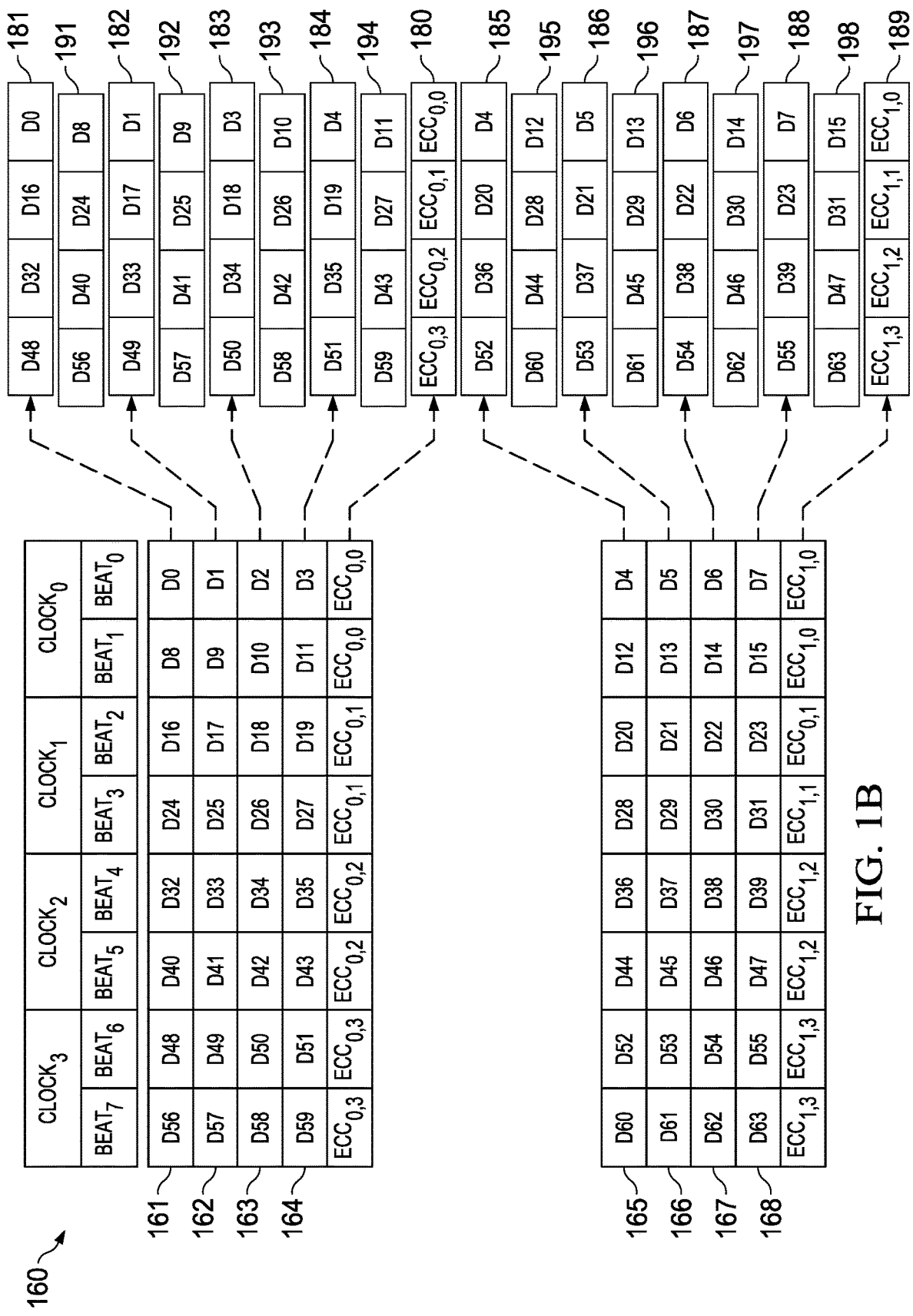
FIG. 1B is a data sequence table illustrating a DDR5 data burst of 80 bytes splitting into 18 of ×8 DDR4-SDRAM chips on the even beats and odd beats.

FIG. 1B is data sequence table illustrating a DDR5 data burst 160 of 8× (4-bytes data+1-byte $ECC_0$+4-bytes data+ 1-byte $ECC_1$) splitting into 18×4-bytes written into 18 of DDR4-SDRAM chips. The data bursts 161, 162, ... 168 are 8 bytes each written into the data buffer chips by the host, and are split into half-rate and half-length bursts 181, 182, ... 188 at the even clock $beat_{0,2,4,6}$ and half-rate and half-length bursts 191, 192, ... 198 at the odd clock $beat_{1,3,5,7}$, and then written into the selected 16 DDR4-SDRAM chips. Each $ECC_0$ and $ECC_1$ bytes are written twice as two ECC bursts, $ECC_{0,0}$~$ECC_{0,3}$ 180 and $ECC_{1,0}$~$ECC_{0,3}$ 189, into two DDR4-DRAM chips rather than four chips, as there are only a total 18 or 36 DDR4-DRAM chips on the DIMM device instead of 20 or 40. The $ECC_{0,0}$~$ECC_{0,3}$ and $ECC_{1,0}$~$ECC_{1,3}$ at even clock beats can be read by the host, and other ECC bytes at odd clock beats are oxFF (pull-up unused byte-channel 130).

FIG. 2A is a block diagram illustrating a normal DDR5 dual-channel memory system 200 for comparison. DDR5 memory system 200 includes two DDR5 sub-channels 221, 222 of 32 bits data and 8 bits ECC each. The sub-channels 221, 222 are coupled between a host CPU 210 and a DDR5 DIMM 230. The host CPU may be a CPU, or may be, for example, a CPU in combination with a memory controller disposed between the CPU and the DDR5 DIMM. If the DDR5 sub-channels 221, 222 are running at relatively-lower transaction rates, for example, of 3200, 3600 or 4000 MT/s, the DDR5 system may be running with two DIMMs per channel (2DPC). To run the sub-channels 221, 222 at transaction rates higher than 4000 MT/s, such as 6400 MT/s, however, only one DDR5 DIMM can be coupled to the channels as 1DPC, which significantly limits memory capacity available to the host CPU. As an example, a DDR4 system running at 2400 MT/s can have three DPC and four DRAM chips per each data-buffer on the DDR4 DIMMs. A DDR5 system, on the other hand, running at greater than 4000 MT/s (e.g. 6400 MT/s) has only one DPC and two chips per each data-buffer on the DDR5 DIMM. Thus, with half the DRAM chips and one-third the DPC, the DDR5 system has one-sixth the memory capacity of the DDR4 system.

In an embodiment, the DDR5 dual-channel sub-buses are split and coupled two different hybrid DDR5 DIMM devices, thus doubling memory capacity without sacrificing bus speed performance. That is, an embodiment doubles the number of DIMMs on the memory buses compared to DDR5, thus doubling a host's total memory capacity.

FIG. 2B is a block diagram illustrating a hybrid DDR5 system 250. The system doubles the effective DDR5 memory capacity by splitting the DDR5 sub-channels to pairs of separated hybrid DDR5 DIMMs having low cost available DDR4 SDRAM chips. Specifically, hybrid DDR5 memory system 250 includes two DDR5 sub-channels 271, 272 of 32 bits DDR5 data and 8 bits DDR5 ECC each. The DDR5 sub-channels 271, 272 are coupled between a host CPU 260 and a pair of hybrid DDR5 DIMMs 281, 291 as 1DPC at 6400 MT/s speed. Each hybrid DDR5-DIMM device uses currently-available lower-cost DDR4-DRAM chips, with the chips operating at half the speed of the external DDR5 sub-channels. The data-buffers on the hybrid DDR5 DIMMs, along with the slower (½ speed) on-DIMM memory sub-channels, allows multiple-DIMM fan-out for each DDR5 channel. For example, as illustrated in FIG. 2B, a two DPC system with hybrid DDR5 DIMMs 281, 282 on one DDR5 sub-channel 271, and hybrid DDR5 DIMMs 291, 292 on the other DDR5 sub-channel 272, may be run at 4400 MT/s or slower speeds host interface on the external DDR 5 sub-channels 271, 272, with the DDR4 byte-channels on the hybrid DDR5 DIMMs being operated at 2200 MT/s, with four DDR4 SDRAMs per data-buffer. As another example, a four DPC system with may be run at 4266 MT/s, with the DDR4 byte-channels running at half that transaction rate 2133 MT/s. Thus, an embodiment uses hybrid DDR5-DIMMs having current DDR4-DRAM chips to double DDR5-DIMM capacity while still providing DDR5 performance.

The host CPU, and pairs of edge card sockets for each hybrid DDR5 DIMMs, are mounted on a PCB motherboard. The host CPU may be soldered to the motherboard, or inserted in a low-insertion force or zero-insertion force socket. The DDR5 sub-channels may be implemented as traces on the motherboard coupled between the host CPU and the edge card sockets. The DIMMs may be mounted in the edge card sockets by their edge card connectors.

Figure 3A:
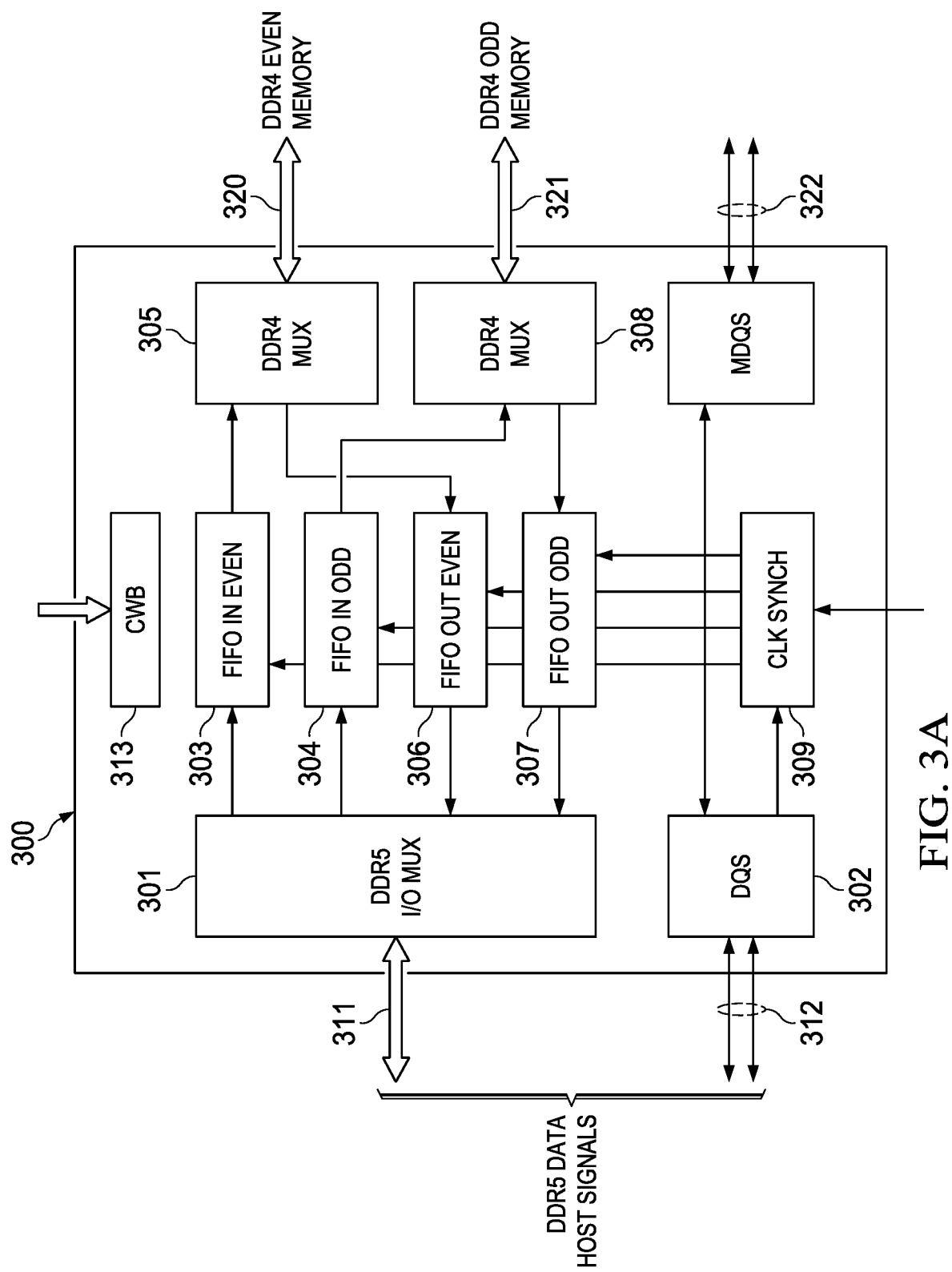
FIG. 3A is a block diagram illustrating a DDR4-to-DDR5 speed doubling data-buffer chip with even and odd input/out FIFOs.

FIG. 3A is a block diagram illustrating a DDR4-to-DDR5 speed doubling data-buffer chip 300. The data-buffer chip 300 includes DDR5 I/O Multiplexer 301 and DQS strobe interface 302 to interface with host DDR5 memory controller, and data input first-in first-out (FIFO) buffers FIFO in even 303 and FIFO in odd 304 to latch input data bursts at the even beats (DQS falling edge) and odd beats (DQS rising edge), respectively, and data output FIFO buffers FIFO out even 306 and FIFO out odd 307 to double the speed of DDR4 bursts up to the DDR5 rate, and two DDR4 I/O Multiplexers 305 and 308 to interface with two sets of (half DDR5 speed) DDR4-DRAM chips. The DDR5 data bus is 8-bits in width and up to 6400 MT/s in speed as the host interface 311 and 312 of the data buffer chip. The DDR4 data buses are two buses of 8-bits in width and up to 3200 MT/s in speed, with interfaces DDR4 Multiplexers 320, 321 and MDQS strobe interface 322 interfacing with two set of DDR4 SDRAM chips. The control input port CWB 313 is the Control Word Bus from the DDR5-DDR4 RCD command/address chip to interpret and then forward the host controls.

Figures 3B, 4B:
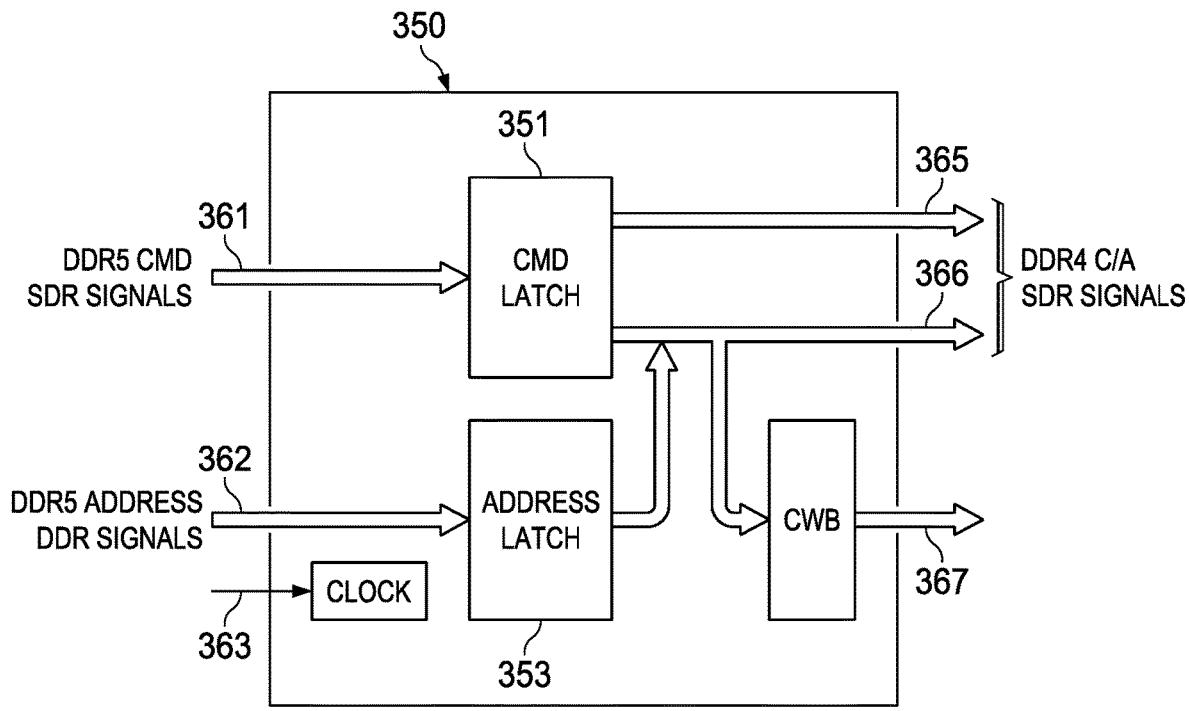
FIG. 3B is a block diagram illustrating a DDR5-to-DDR4 RCD (DDR5-to-DDR4 command/address registered adapter)
FIG. 4B is an op-code table illustrating various operation modes of cascading switched speed/capacity doubling data-buffer chip.

FIG. 3B is a block diagram illustrating a DDR5-to-DDR4 RCD 350 for translating between DDR5 and DDR4 commands/addresses. The DDR5-to-DDR4 RCD chip 350 includes a Command (CMD) Latch 351 and Address Latch 353. DDR5 commands in single data rate (SDR) signaling 361 and addresses in double data rate (DDR) signaling 362 are buffered, and then retimed to half speed DDR4 commands and addresses on DDR4 C/A control bus 365 and 366 to control the 18 or 36 DDR4 SDRAM chips. The clock 363 interface synchronizes the DDR5 bus reference clocks and then regenerates the half speed DDR4 clocks and bus timings. The CWB 367 is the Control Word Bus used to control all the DDR5 rate/capacity double data buffer chips. DDR5 burst 8 (BL8) and burst 16 (BL16) commands are adapted into DDR4 burst 4 (BC4) and BL8 commands with expanding latched DDR5 address bits at falling edge and rising edge of the clock, DDR5 burst 32 (BL32) command is adapted as two DDR4 BL8 command with regenerated consecutive addresses or the same address to other rank of SDRAMs.

Figure 4A:
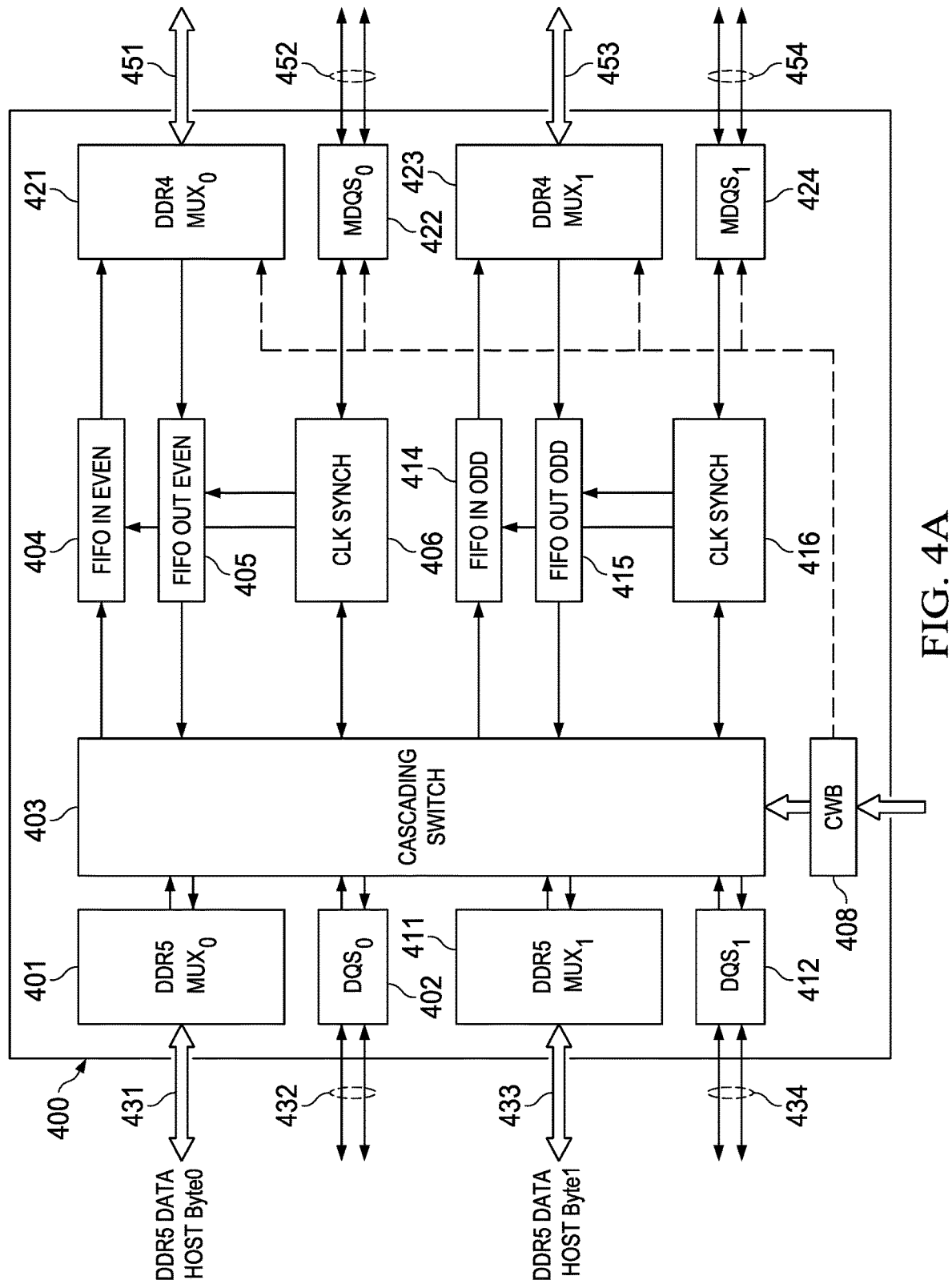
FIG. 4A is a block diagram illustrating DDR5 cascading switched speed/capacity doubling data-buffer chip for either doubling speed of DDR4 SDRAM chips or doubling numbers of DDR5 SDRAM chips at 4000 MT/s or slower.

FIG. 4A is block diagram illustrating DDR5 cascading switched speed/capacity doubling data-buffer chip 400 for either DDR5 or DDR4 SDRAM chips. Data-buffer 400 includes two host high speed DDR5 ports 431 and 432. DQ and DQS signals interfaced by the DDR5 Mux0 401 and Mux1 411 are clocked by DQS0 402 and DQS1 412. The CWB 408 control word bus from the host control bus through the RCD chip sets up the operation mode of the Cascading Switch 403 on the fly to direct the data traffic within four basic modes: normal, DDR5-to-DDR4, DDR5-to-DDR5 slow/cheaper, and cascade. The FIFO in even 404 and FIFO in odd 405 can function as normal FIFOs in normal mode or half-rate FIFOs to latch even bytes at the falling edge of DQS or odd bytes at the rising edge of DQS in DDR5-4 or DDR5-5 modes. The FIFO out even 414 and FIFO out odd 415 can pop out bytes in normal mode, or interleave bytes in DDR5-4 or DDR5-5 modes. Or they can directly latch data in the switch then deliver the data between the host port 0 and port 1 in the cascade mode. Two memory interface ports with MDQ0 451 and MDQS0 452 signals, and MDQ1 453 and MDQS1 454 signals, respectively, communicate data between DDR5 or DDR4 SDRAM chips that are interconnected to the DDR4 Mux0 421 and DDR4 Mux1 423 and the FIFO in 404, 405 and FIFO out 414, 415 buffers. The connections from CWB 408 to the memory I/O functional blocks are the timing control signals from the host control and address bus received through the RCD chip.

FIG. 4B is an op-code table 460 listing a few operational modes of the cascading switched speed/capacity doubling data-buffer chip 400. Op-code [0,0,0] is "By-pass" mode for two normal DDR5 data-buffers in one package. Op-code [0,0,1,0/1] is "DDR5-4" mode for DDR5 host port 0 or 1 splitting into two DDR4 memory ports. Op-code [0,1,0,0/1] is "DDR5-5" mode for DDR5 memory port 0 or 1 splitting into two slow cheaper DDR5 SDRAMs. Op-code [1,1,1,0/1] is "cascade" mode to switch the DDR5 host port 0 or 1 to the cascading port 1 or 0 that are connected to next DIMM devices, enabling the same DDR5-DIMM devices to function in the various implementations described herein below, and the like. In "DDR5-5" mode, the data-buffer can fan-out 4 slow/cheaper DDR5-SDRAM chips at 3200 MT/s speed instead of 2 fast DDR5-SDRAM chips at 6400 MT/s speed for more memory capacity. In "cascade" mode, multiple DDR5-DIMM devices can be chained together through their two sub-channels in order to reach even larger memory capacities as needed. This special data-buffer in "DDR5-4" mode is to double DDR4-SRAM speed into DDR5 speed, or in "DDR5-5" mode to double both speed/capacity of slow DDR5-SRAM chips to 4-chips per byte-channel even beyond 6400 MT/s.

Figure 5:
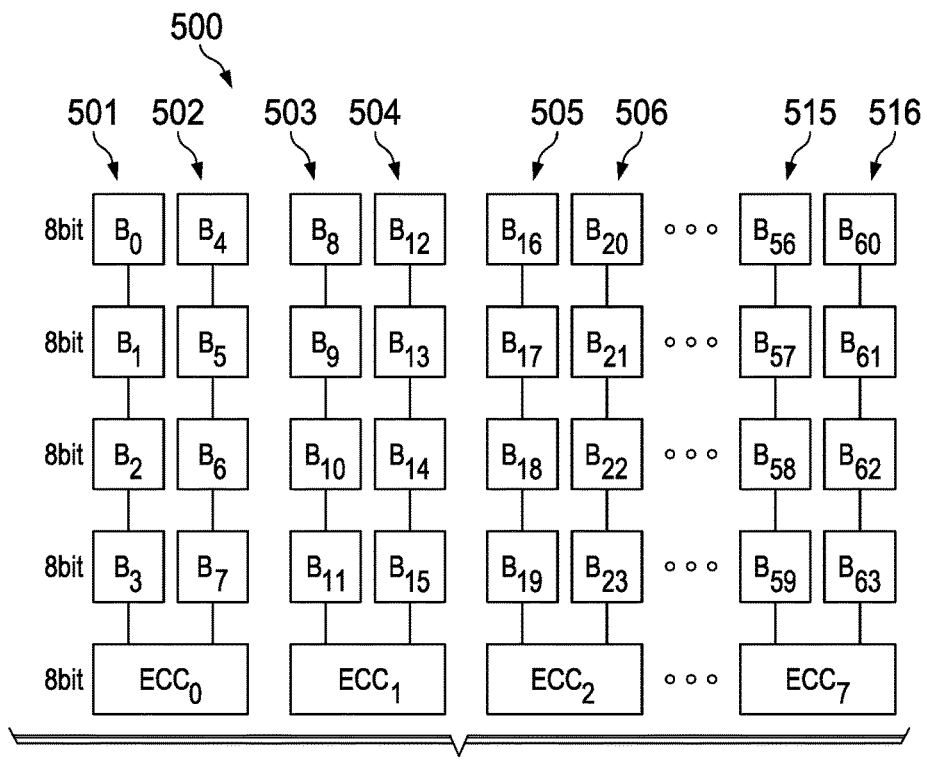
FIG. 5 is a block diagram illustrating a DDR5 ECC scheme for 18 DDR4-DRAMs.

FIG. 5 is a block diagram illustrating a DDR5 ECC scheme 500 for 18 DDR4-DRAMs. As shown below, data bits 0-3, 501 and data bits 4-7 502 are used to generate first bit $ECC_0$ of the ECC. Bits 8-11, 503 and bits 12-15 504 are used to generate second bit $ECC_1$ of the ECC. Bits 16-19, 505 and bits 20-23 506 are used to generate third bit $ECC_2$ of the ECC, and so on, up to bits 56-59, 515 and bits 60-63 516 are used to generate seventh bit $ECC_3$ of the ECC bytes. Each ECC byte calculated from 8-byte data of consecutive 32 bit data is written to the hybrid DIMM twice to fit the 36 DDR4-SRAM chips. The ECC bytes latched at the odd clock beats as host reading the hybrid DIMM should be ignored by the host, only the ECC bytes latched at the even clock beats could be used by the host to decode the 64 bit data.

$$ECC_o = \text{Hamming}(B_{\{0,1,\ldots7\}}, \text{Parity } B_{\{0,1,\ldots7\}}),$$

$$ECC_1 = \text{Hamming}(B_{\{8,9,\ldots15\}}, \text{Parity } B_{\{8,9,\ldots15\}})$$

$$\ldots$$

$$ECC_7 = \text{Hamming}(B_{\{8,9,\ldots15\}}, \text{Parity } B_{\{8,9,\ldots15\}}).$$

Figure 6:
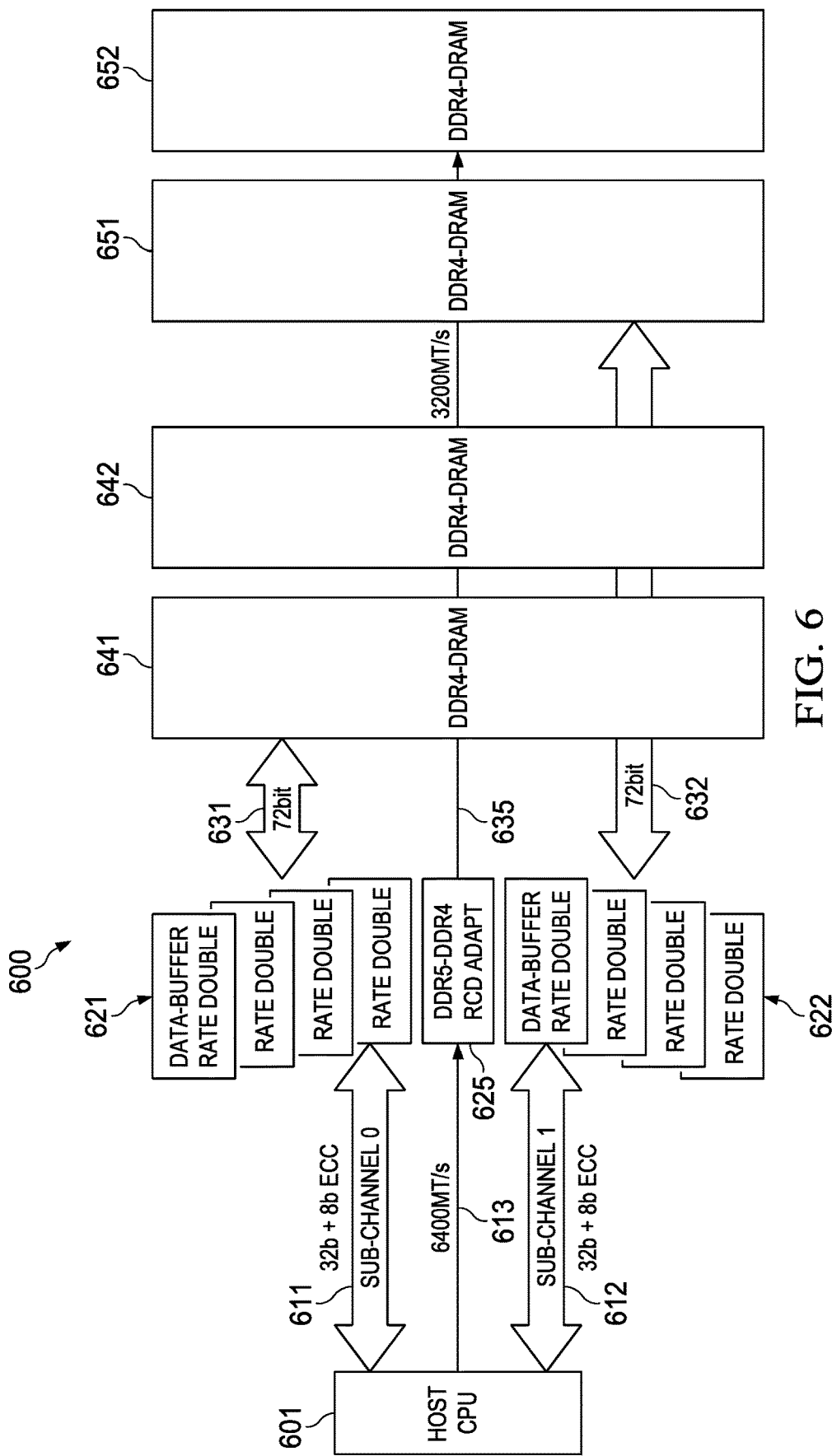
FIG. 6 is a block diagram illustrating a DDR5 speed doubler on a motherboard for using standard DDR4-DMMs.

FIG. 6 is a block diagram illustrating an alternative embodiment DDR5 dual-channel memory system 600 to double speed of current DDR4-DRAM DIMM devices for DDR5 performances. Host CPU 601, and DDR5 sub-channels 611, 612, including DDR5 commands/addresses 613, operating at 6400 MT/s operate as previously described. In this embodiment, however, data-buffers/speed doublers 621, 622 and DDR5 DDR4 RCD adaptor 625 are mounted on the motherboard instead of on hybrid DDR5 DIMMs. Further, standard DDR4 DIMMs 641, 642, 651, 652 are mounted on the motherboard instead of using hybrid DDR5 DIMMs. Thus, because standard DDR4 DIMMs are used, the DDR5-to-DDR4 interface, including the data-buffers and the RCD, are mounted on the motherboard between the host CPU and the available DDR4 DIMMs. The 72-bit DDR4 channels 631, 632 and DDR4 commands/addresses provide a DDR4 interface from the data-buffers and RCD to the DDR4 DIMMs. At a 6400 MT/s DDR5 sub-channel rate, the DDR4 memory can be operated with 4 DPC and 4-chips per data-buffer. This provides eight times the capacity of a one-DPC, 2-SDRAM chips per data-buffer limits.

Figure 7A:
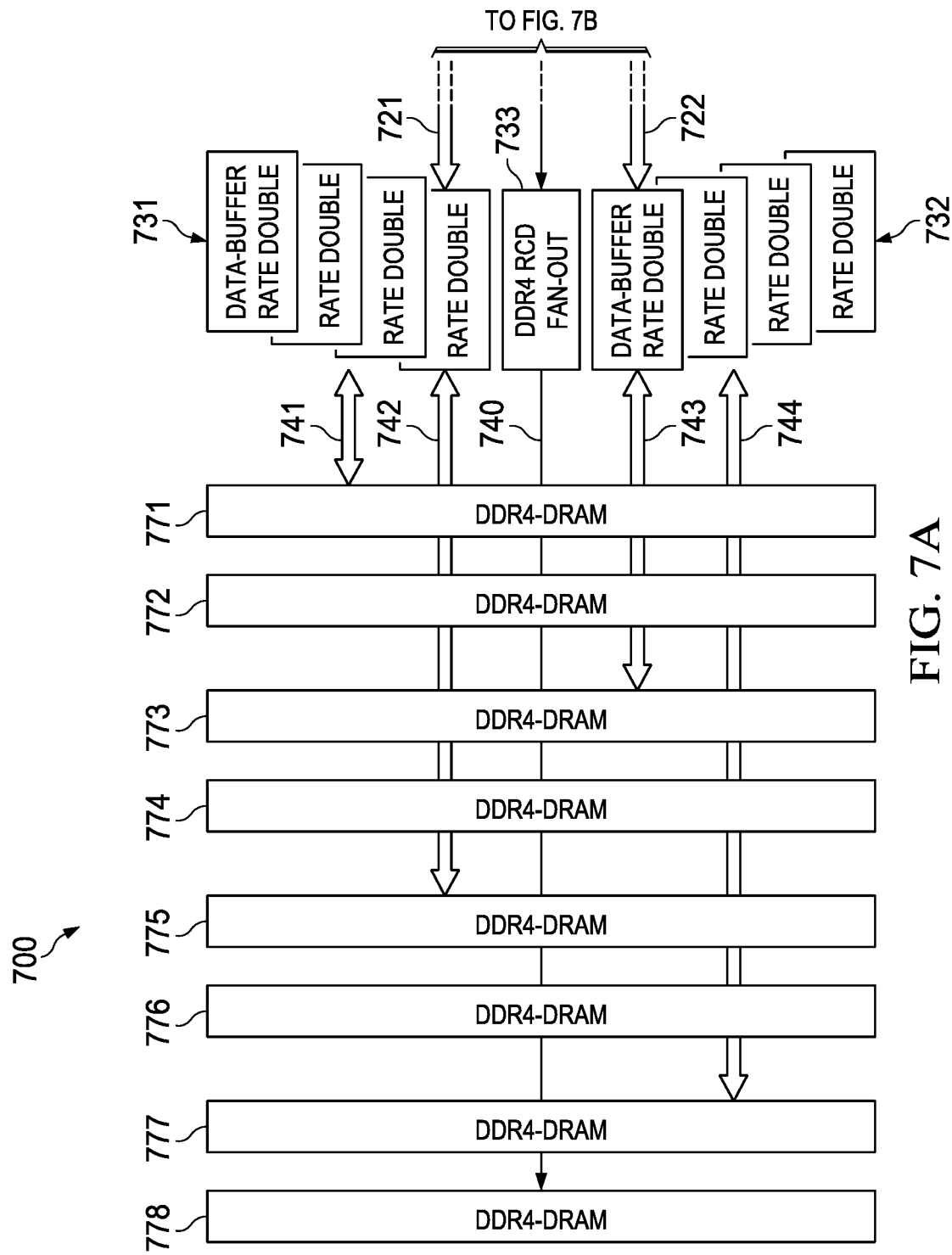
FIGS. 7A and 7B are block diagrams illustrating a far-memory CCIX-SerDes expansion to DDR5 data-buffer rate-doubler motherboard with available DDR4-DIMMs of SDRAMs and emerging PM/NVMs.
Figure 7B:
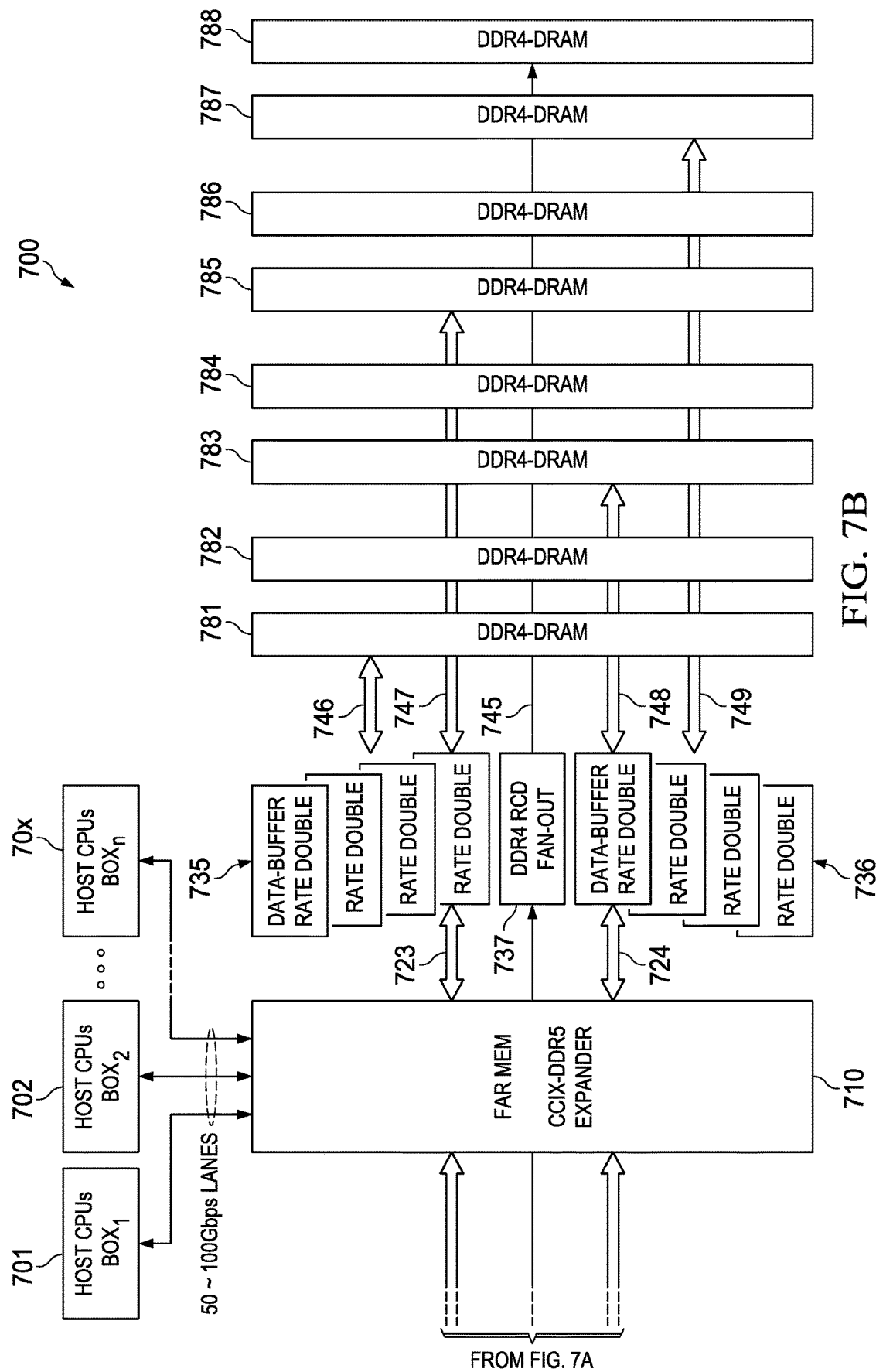

FIGS. 7A and 7B are is a block diagrams illustrating system 700 with a far-memory cache coherent interconnect for accelerators (CCIX)/serializer/deserializer (SerDes) expansion to DDR5 data-buffer-doubler memory bus with DDR4 DIMMs. In this embodiment, a plurality of host CPUs 701, 702, . . . , 70x are coupled to a far memory CCIX-DDR5 expander 710 via respective 50-100 Gbps SerDes connections. The far memory CCIX-DDR5 expander 710 in turn is coupled to two DDR5 dual-channels, including DDR5 sub-channels 721, 722, 723, 724. Each of the DDR5 sub-channels is coupled to a respective set of data-buffer/rate doublers 731, 732, 735, 736, and each set of data-buffers is coupled to respective ones of DDR4 DIMMs 771-778, 781-788 via respective DDR4 byte-channels 741-744, 746-749. Far memory CCIX-DDR5 expander 710 also is coupled to the DDR4 DIMMs via RCDs 733, 737. This embodiment provides a bus rate of 6400 MT/s, which is two times the DDR4 bus rate, and provides total capacity of eight times that of DDR5. It also provide 12.5% ECC rather than 25% ECC. Note that 25 Gbps SerDes uses 4-pins/lane to provide four times 6.4 Gbps peak bandwidth with power in the 4 C V² f range. The CCIX-to-DDR5 far memory expansion controller also includes the lever 4 (L4) cache management engines to enable the emerging DDR4-3DXP DIMMs and DDR4-MP/NVM DIMMs for synchronous SerDes accesses to the cache-hit DRAM space and for nondeterministic accesses to the cache-miss memory space on the 3DXP and other MP/NVM devices, shared by various remote CPUs in different server boxes.

In another embodiment, the DDR5 dual-channel DIMM devices are more flexible implemented in a cascadable fashion to provide multiple DIMMs for capacity expansion. The DDR5 DRAM chips are cascadable for easier PCB routing and better performance, or could use low power DDR4 (LPDDR4) DRAMs. A simple nondeterministic protocol is used for cascading DRAM, 3D-XPoint, managed-DRAM, or fast-flash memories. The DDR5 high speed bus works with current DDR4 DRAMs and available persistent memory (PM)/non-volatile memory (NVM) or flash chips for lower cost.

Figure 8:
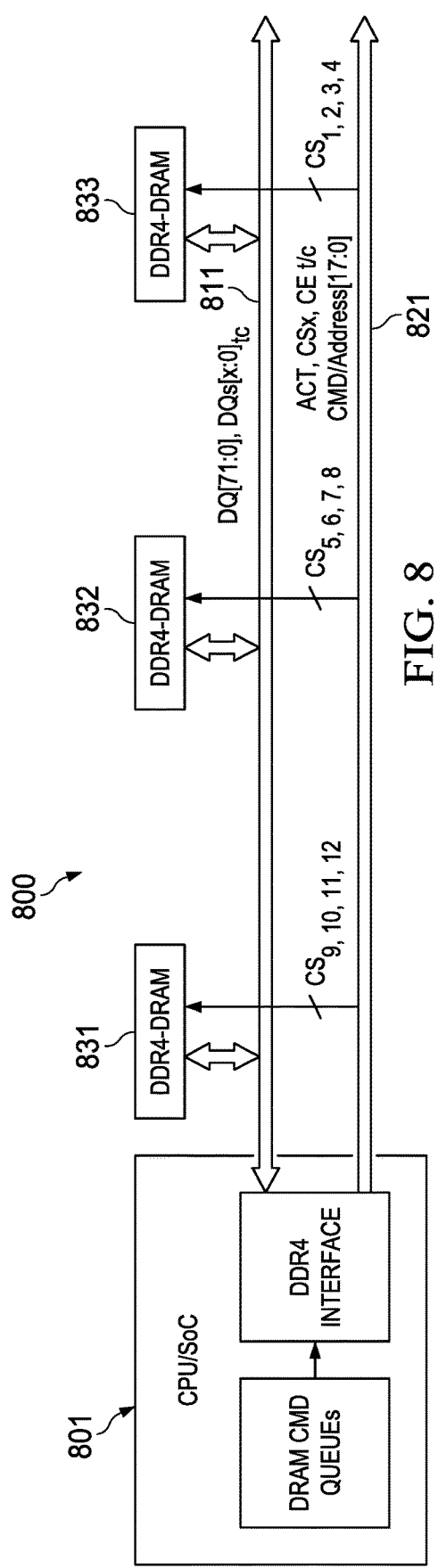
FIG. 8 is a block diagram illustrating a DDR4 bus with 3 DPC at 2400 MT/s.

First, for comparison, FIG. 8 is a block diagram illustrating a current DDR4 bus system 800. CPU/system on a chip (SoC) 801 is coupled to a DDR4 channel including data bus 811 and command/address bus 821. There are three DDR4 DIMMs 831, 832, 833 on the DDR4 channel. With the three DIMMs on the channel (3 DPC) the channel can run at 2400 MT/s.

Figure 9:
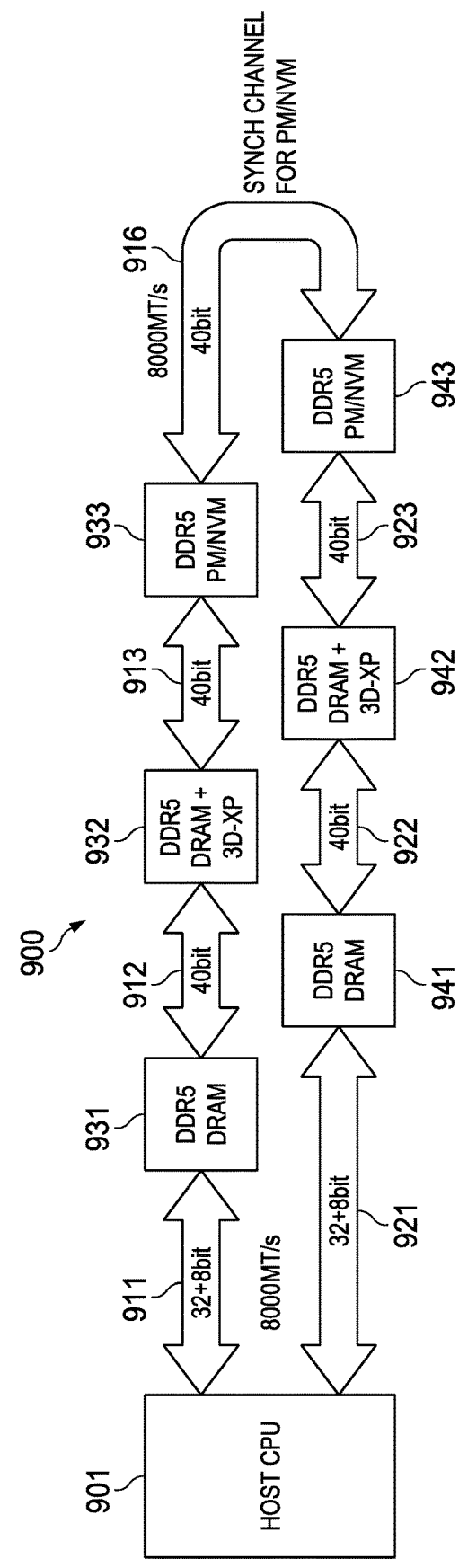
FIG. 9 is a block diagram illustrating a DDR5 cascadable bus to aggregate DDR5-DIMM devices for more memory capacities.

FIG. 9 is a block diagram illustrating system 900 with a DDR5 cascadable bus to aggregate DDR5-DIMM devices for higher bus speed and more memory capacities. A host CPU 901 is coupled to two 40-bit data/ECC DDR5 sub-channels 911, 921, which in turn are coupled to DDR5 SDRAM DIMMs 931, 941, respectively. Each of the DDR5 SDRAM DIMMs 931, 941 is cascaded, via a 40-bit bus 912, 922, respectively, to a DDR5 SDRAM/3D-Xpoint (3DXP) device 932, 942, respectively. An example of 3D-XP memory is emerging persistent memory. Each of the DDR5 SDRAM/3D-Xpoint devices 932, 942 is cascaded, via 40-bit data/ECC bus 913, 923, respectively, to a DDR5 SDRAM/PM/NVM device 933, 943, respectively. An example of PM is emerging persistent memory, and an example of NVM is flash memory. Finally, the two DDR5 SDRAM/PM/NVM devices 933, 943 are coupled to each other via a synch channel 916 for the PM/NVM. With cascading 6 to 10 DPC, the system is capable of running at 8000 MT/s speed with point-to-point interconnections between each cascaded DIMM devices. With introduction DDR5 SDRAM chips at slow 4000 MT/s, the cascading DDR5 DIMM scheme could support double speed rate of 8000 MT/s with much needed memory capacity expansions, the cascading access latency penalties for accessing DDR5 3DXP DIMM or DDR5 PM/NVM DIMM devices could be ignored because they have much longer access latencies than DRAM already. Specific mechanisms for cascading DDR5 DIMMs and the other memory types are described below with respect to FIGS. 12-14.

Figure 10:
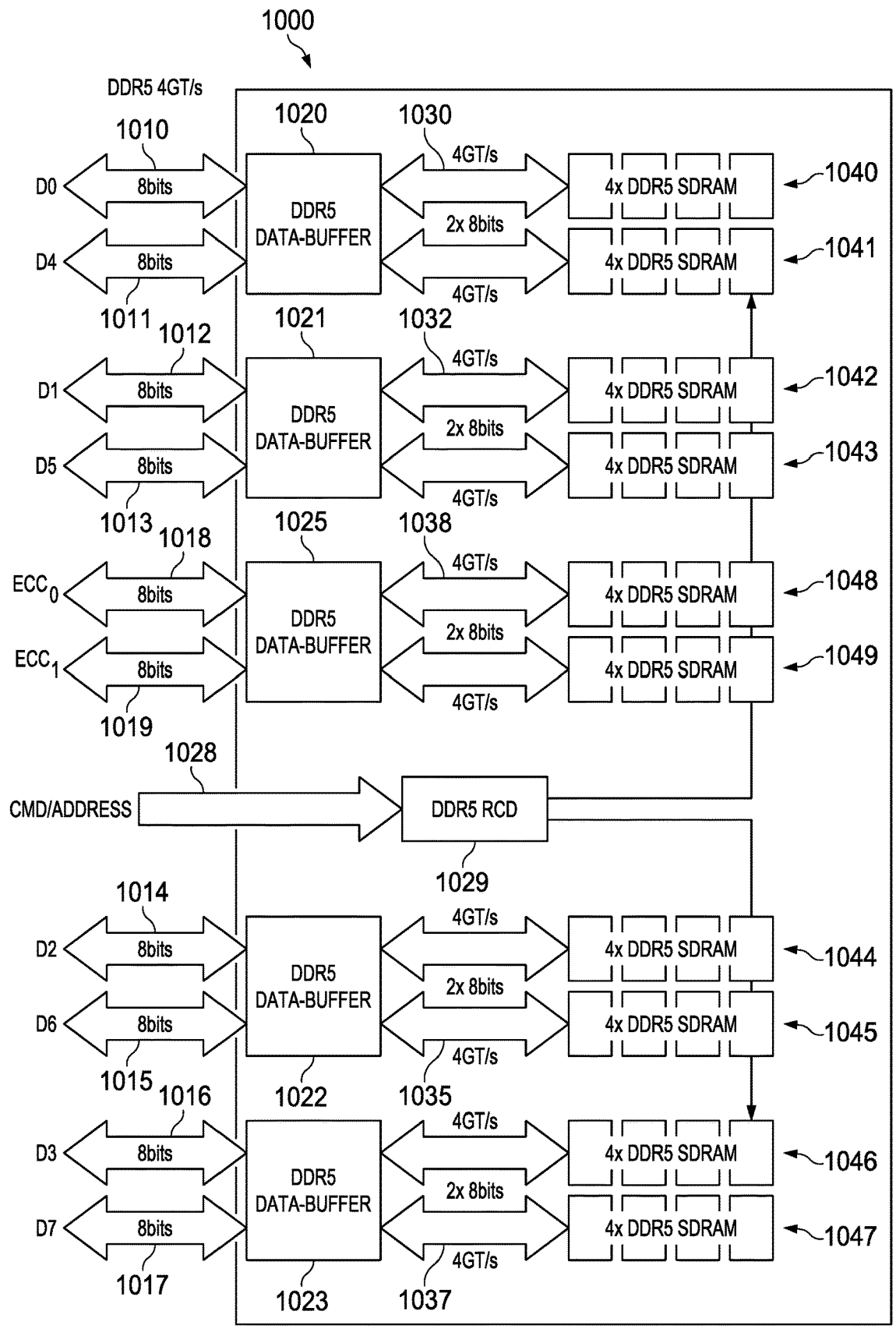
FIG. 10 is a block diagram illustrating a DDR5-DIMM device with data-buffer at 4 GT/s to fan-out four chips in byte-interleaving sub-channel pin re-assignments.

First, FIG. 10 is a block diagram illustrating a normal DDR5-DIMM device 1000 with data-buffers at 4 GT/s to fan-out four DDR5 SRAM chips in byte-interleaving sub-channel pin assignments, modified from proposed DDR5 standard pin assignments. The DDR5 external interface operates at 4 GT/s and provides both DDR5 sub-channels as 64 bits of data, D0 1010, D1 1012, D2 1014, D3 1016, D4 1011, D5 1013, D6 1015 and D7 1017, as well as 16 bits of ECC, ECC0 1018 and ECC1 1019. Each pair of data or ECC bytes is received by a respective DDR5 data-buffer, 1020-1025. The DDR5 data-buffers are coupled to respective sets of four DDR5 SDRAMs 1040-1049 via respective pairs of DDR5 sub-channels 1030-1038 operated at 4 GT/s. External commands/addresses 1028 are fanned-out to the DDR5 SDRAMs by DDR5 RCD 1029.

Figure 11:
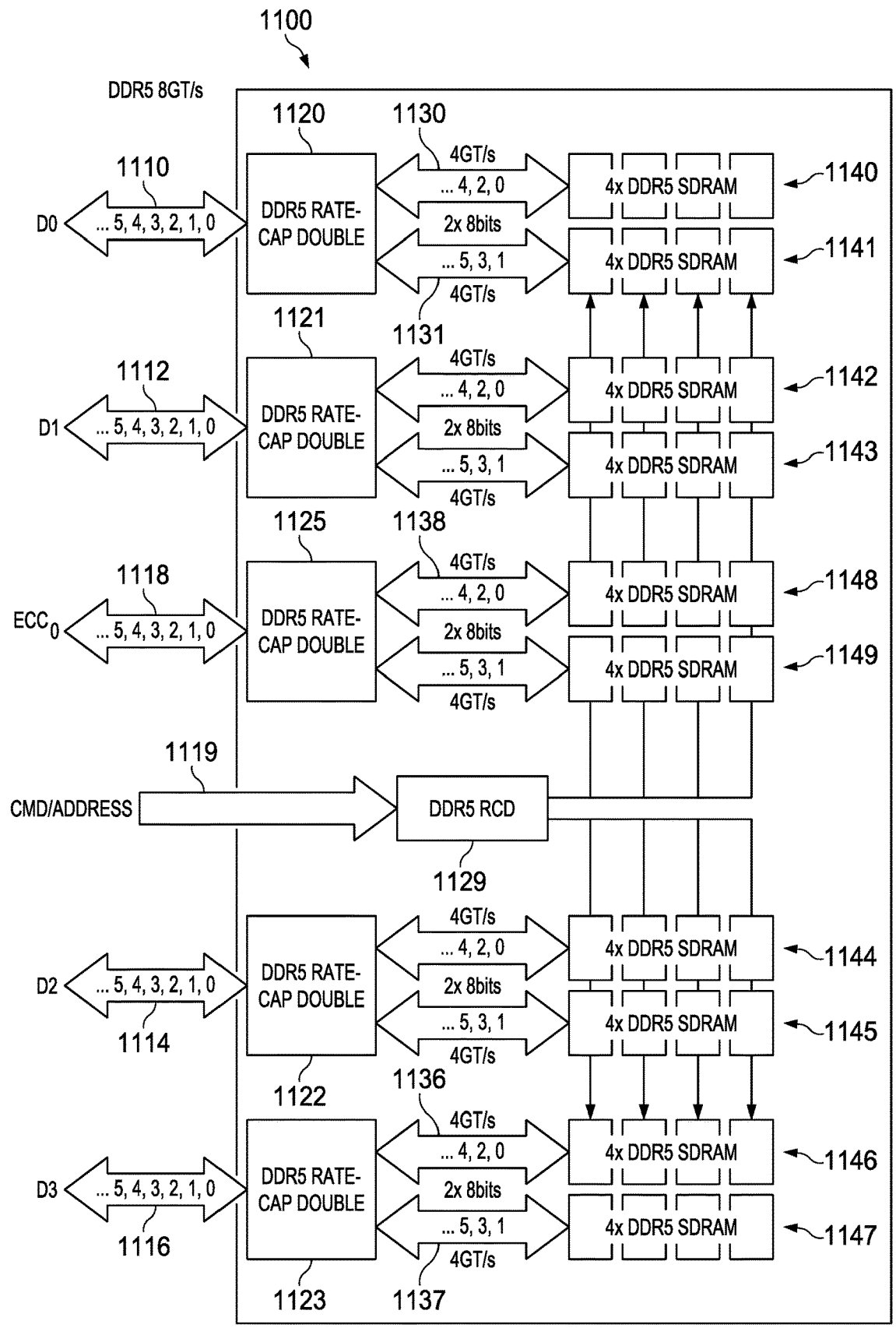
FIG. 11 is a block diagram illustrating a DDR5-DIMM device at 8 GT/s with a rate-capacity doubling data-buffer to fan-out four chips of DDR5-SDRAM at 4 GT/s per ×8 channel.

Second, modifying FIG. 10's implementation, FIG. 11 illustrates a DDR5-DIMM device 1100 having an 8 GT/s external interface and rate-capacity double data-buffers to fan-out to four chips of DDR5-SDRAM at 4 GT/s, with data-buffers set as DDR5-5 mode, instead of two chips at maximum 6400 MT/s speed. FIG. 11 is similar to FIG. 10, except that only one DDR5 sub-channel is received by device 1100. The DDR5 external interface operates at 8 GT/s and provides the one DDR5 sub-channel as 32 bits of data, bytes D0 1110, D1 1112, D2 1114, D3 1116, as well as 8 bits of ECC, ECC0 byte 1118, to the DDR5 SDRAMs. Each external DDR5 data or ECC byte is received by a respective DDR5 rate-capacity doubler data-buffer, 1120-1125. The DDR5 data-buffers are coupled to respective pairs of interleaved DDR5 sub-channels 1130-1138 operated at 4 GT/s, or half that of the 8 GT/s external DDR5 channel. Each DDR5 sub-channel in turn is coupled to a respective set of four of the DDR5 SDRAMs 1140-1149. External DDR5 commands/addresses 1119 are fanned-out to the DDR5 SDRAMs by DDR5 RCD 1129. DDR5 device 1100 of FIG. 11 thus provides twice the storage capacity for the DDR5 sub-channel as that of DDR5 device 1000 of FIG. 10. A second DDR5 device 1100 may be coupled to the other DDR5 sub-channel of a dual-channel DDR5 system.

Figure 12:
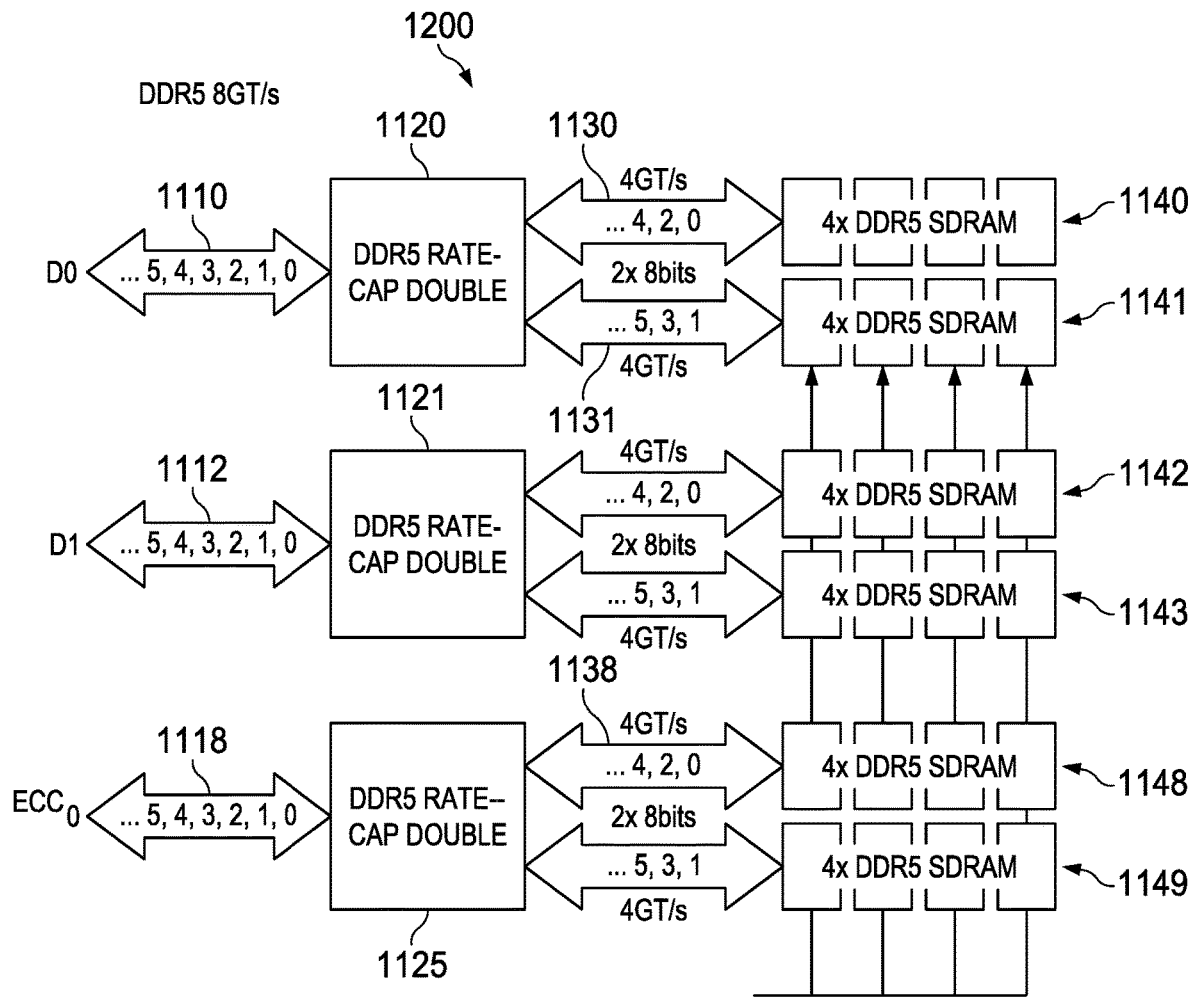
FIG. 12 is a block diagram illustrating a DDR5 data-buffer of a rate-capacity double and cascading switch.
Figure 13:
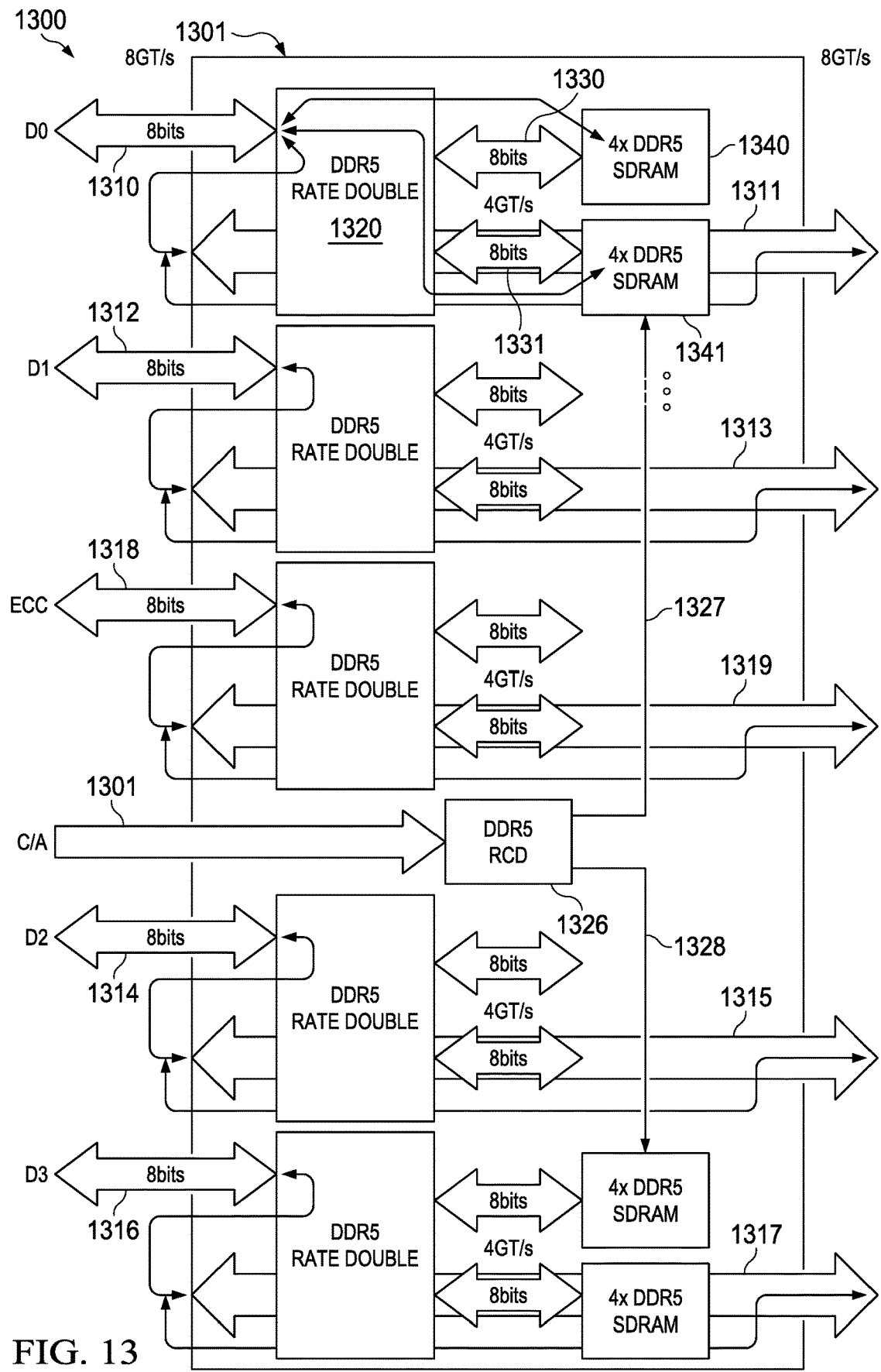
FIG. 13 is a block diagram illustrating a DDR5-DIMM at 8 GT/s in cascading mode with 4 GT/s SDRAM chips.

Further modifying FIG. 10's and FIG. 11's implementations, FIG. 12 illustrates a DDR5 data-buffer 1200 with rate-capacity doubling and cascading switch data-buffers for DIMM cascading. The DDR5 external interface, only a portion of which is illustrated, operates at 8 GT/s and provides the one DDR5 sub-channel as 32 bits of data (bytes D0 1110 and D1 1112 are shown), as well as 8 bits of ECC, ECC0 byte 1118, to the DDR5 SDRAMs on the DDR5 DIMM. Each external DDR5 data or ECC byte is received by a respective DDR5 rate-capacity doubler/cascading switch data-buffer. For the bytes shown, data-buffer 1120 is coupled to external byte D0 1110, data-buffer 1121 is coupled to external byte D1 1112, and data-buffer 1125 is coupled to external ECC0 byte 1118. The DDR5 data-buffers are coupled to respective pairs of interleaved DDR5 sub-channels (e.g., 1130 and 1131 for data-buffer 1120) operated at 4 GT/s, or half that of the 8 GT/s external DDR5 channel. Each DDR5 sub-channel in turn is coupled to a respective set of four of the DDR5 SDRAMs (1040-1143 and 1148-1149 are shown). External DDR5 commands/addresses are fanned-out to the DDR5 SDRAMs by a DDR5 RCD. DDR5 device 1200 of FIG. 12 thus provides the storage capacity of FIG. 11, and, as illustrated by FIG. 13, can be cascaded using an external interface along the lines of FIG. 10. Setup data buffers in DDR5-DDR4 mode with current DDR4 SDRAM chips, this DDR5 DIMM device could run at 6400 MT/s with DDR4 3200 MT/s speed SRAM chips.

FIG. 13 is a block diagram illustrating a DDR5-DIMM 1300 at 8 GT/s in cascading mode with 4 GT/s SDRAM chips. In this embodiment, instead of coupling a byte from each of the two DDR5 sub-channels to each data-buffer as shown in FIG. 10, the second interface of each data-buffer is used to couple the respective byte of one DDR5 sub-channel through to a another cascaded DDR5 DIMM. FIG. 13 combines features of FIGS. 10 and 11 to provide a cascadable DDR5 DIMM 1300. The DDR5 external interface operates at 8 GT/s and provides one DDR5 sub-channel as 32 bits of data, bytes D0 1310, D1 1312, D2 1314, D3 1316, as well as 8 bits of ECC, ECC0 byte 1318, to the DDR5 SDRAMs. Each external DDR5 data or ECC byte is received by a respective DDR5 rate-capacity doubler/cascading switch data-buffer 1320. As in Figure ii, the DDR5 data-buffers are coupled to respective pairs of interleaved DDR5 sub-channels 1330, 1331 operated at 4 GT/s, or half that of the 8 GT/s external DDR5 channel. Each DDR5 sub-channel in turn is coupled to a respective set of four of the DDR5 SDRAMs 1340, 1341. External DDR5 commands/addresses 1301 are fanned-out to the DDR5 SDRAMs by DDR5 RCD 1326 via internal DDR5 command/address interface 1327, 1328. In addition, rate-capacity doubling/cascading switch data-buffers 1320 utilize their second external DDR5 interface (1311-1319) to provide a pass-through, via the data buffers, of the bytes from the external DDR5 sub-channel. Thus, instead of merely connecting to another DDR5 sub-channel for on-DIMM DDR5 SDRAM access, the implementation of FIG. 13 provides a cascaded output of the received DDR5 sub-channel, which can be used to cascade DDR5 DIMMs, as shown in FIGS. 14A and 14B.

Figure 14A:
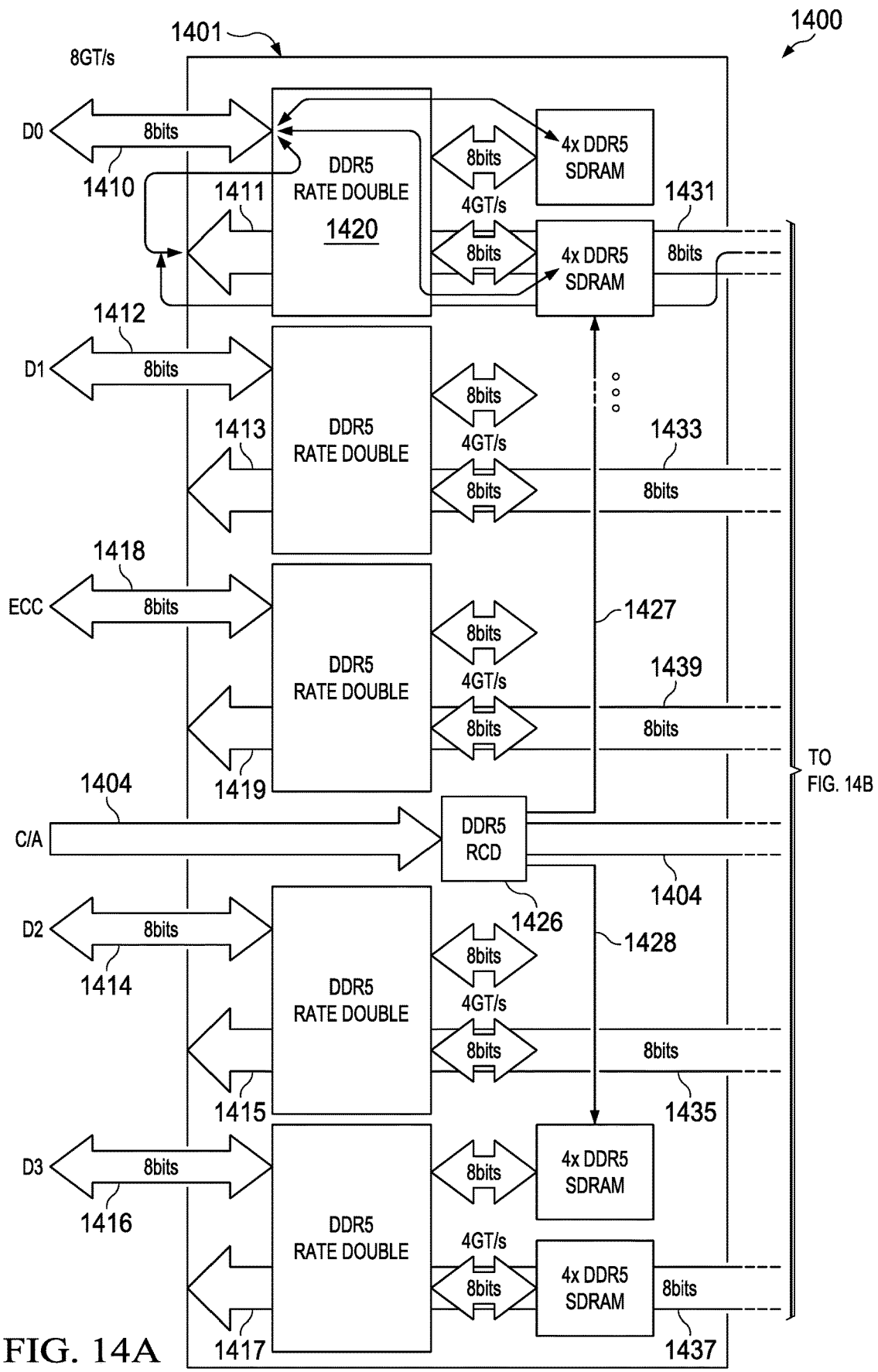
FIGS. 14A and 14B are is block diagrams illustrating cascading DDR5-DIMM devices at 8 GT/s for higher capacities.
Figure 14B:
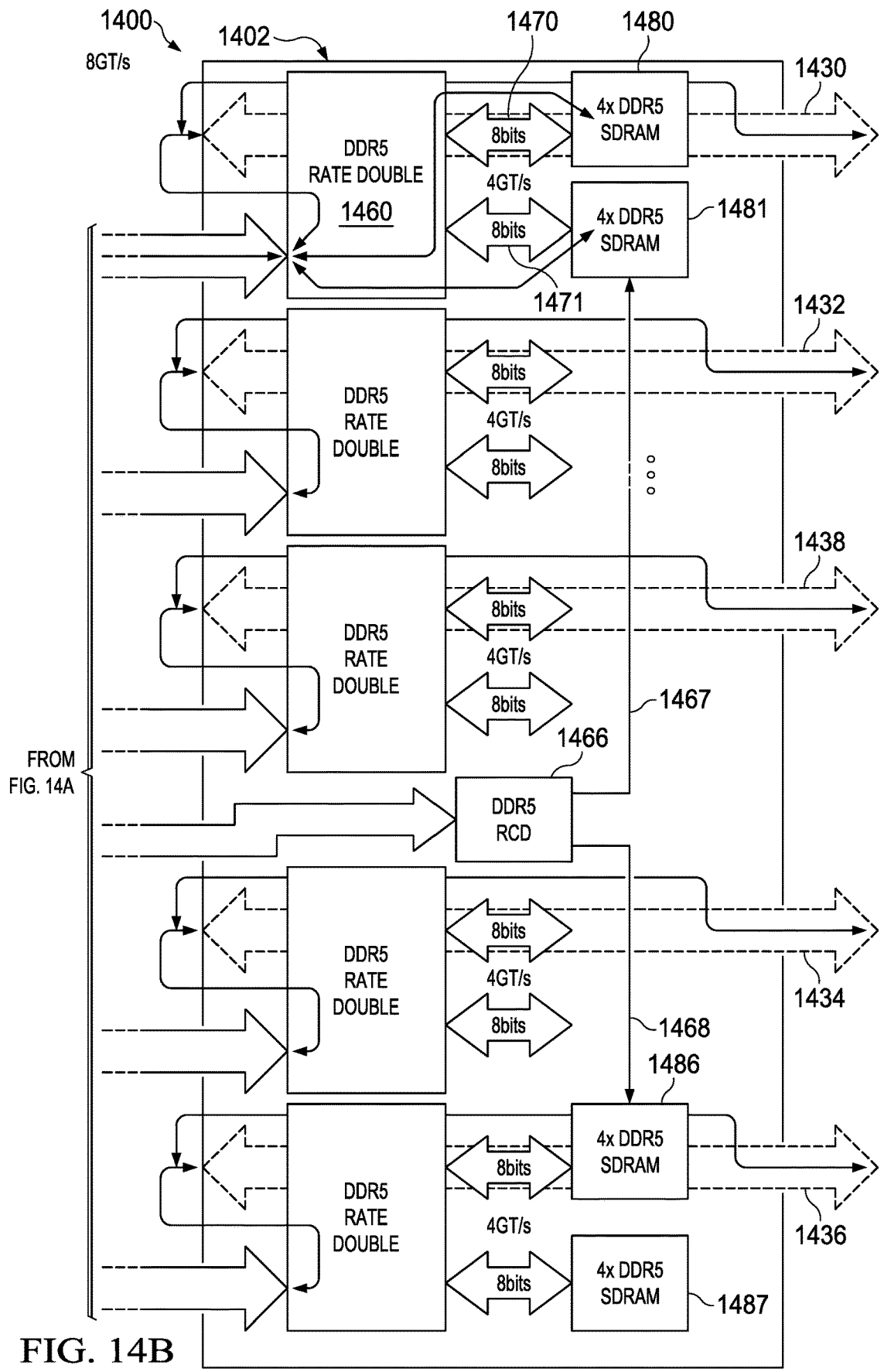

FIGS. 14A and 14B illustrate a cascaded system 1400 with cascaded two DDR5-DIMM devices at operated at 8 GT/s. Two cascadable DDR5 DIMMs 1401, 1402 are cascaded on one DDR5 sub-channel, by the same DDR5-DIMM devices with slightly different setup as DDR5 port 0/1 as the host interface and port 1/0 as cascading device port. The DDR5 external interface operates at 8 GT/s and provides one DDR5 sub-channel as 32 bits of data, bytes Do 1410, D1 1412, D2 1414, D3 1416, as well as 8 bits of ECC, ECC0 byte 1418, to DDR5 DIMM 1401. Each external DDR5 data or ECC byte is received by a respective DDR5 rate-capacity doubling/cascading switch data-buffer 1420. As in FIG. 13, the DDR5 data-buffers are coupled to respective pairs of interleaved DDR5 sub-channels operated at 4 GT/s, or half that of the 8 GT/s external DDR5 channel. Each DDR5 sub-channel in turn is coupled to a respective set of four of the DDR5 SDRAMs. External DDR5 commands/addresses 1404 are fanned-out to the DDR5 SDRAMs by DDR5 RCD 1426 via internal DDR5 command/address interface 1427, 1428.

The second external DDR5 interface (1431, 1433, 1435, 1437, 1439) of rate-capacity doubling/cascading switch data-buffers 1420 provides a pass-through, via the data-buffers, of the bytes from the external DDR5 sub-channel to second DDR5 DIMM 1402.

Second DDR5 DIMM 1402 is configured and operates in a similar manner as that of first DDR5 DIMM 1401. That is, rate-capacity doubling/cascading switch data-buffers 1460 of second DDR5 DIMM 1402 are coupled to second external DDR5 interface (1431-1439) from first DDR5 DIMM 1401. The DDR5 external interface again operates at 8 GT/s and provides the cascaded DDR5 sub-channel as 32 bits of data, bytes D0, D1, D2 and D3, as well as 8 bits of ECC, to DDR5 DIMM 1402. Each external DDR5 data or ECC byte is received by a respective DDR5 rate-capacity doubling/cascading switch data-buffer 1460. As with first DDR5 DIMM 1401, the DDR5 data-buffers are coupled to respective pairs of interleaved DDR5 sub-channels 1470, 1471 operated at 4 GT/s, or half that of the 8 GT/s external DDR5 channel. Each DDR5 sub-channel in turn is coupled to a respective set of four of the DDR5 SDRAMs (1480-1481, . . . , 1486-1487). External DDR5 commands/addresses 1404 are fanned-out to the DDR5 SDRAMs by DDR5 RCD 1466 via internal DDR5 command/address interface 1467, 1468. The second external DDR5 interface (1430, 1432, 1434, 1436, 1438) of rate-capacity doubling/cascading switch data-buffers 1460 may be used to provide a pass-through, via the data-buffers, of the cascaded DDR5 sub-channel to a subsequent DDR5 DIMM, and so on. Or, for the last DDR5 DIMM in a cascade, the second external DDR5 interface is not used, and the DDR5 sub-channel terminates at the last DDR5 DIMM in the cascade. Such cascading of the DDR5 DIMMs allows for higher capacity storage per DDR5 sub-channel.

Figure 15A:
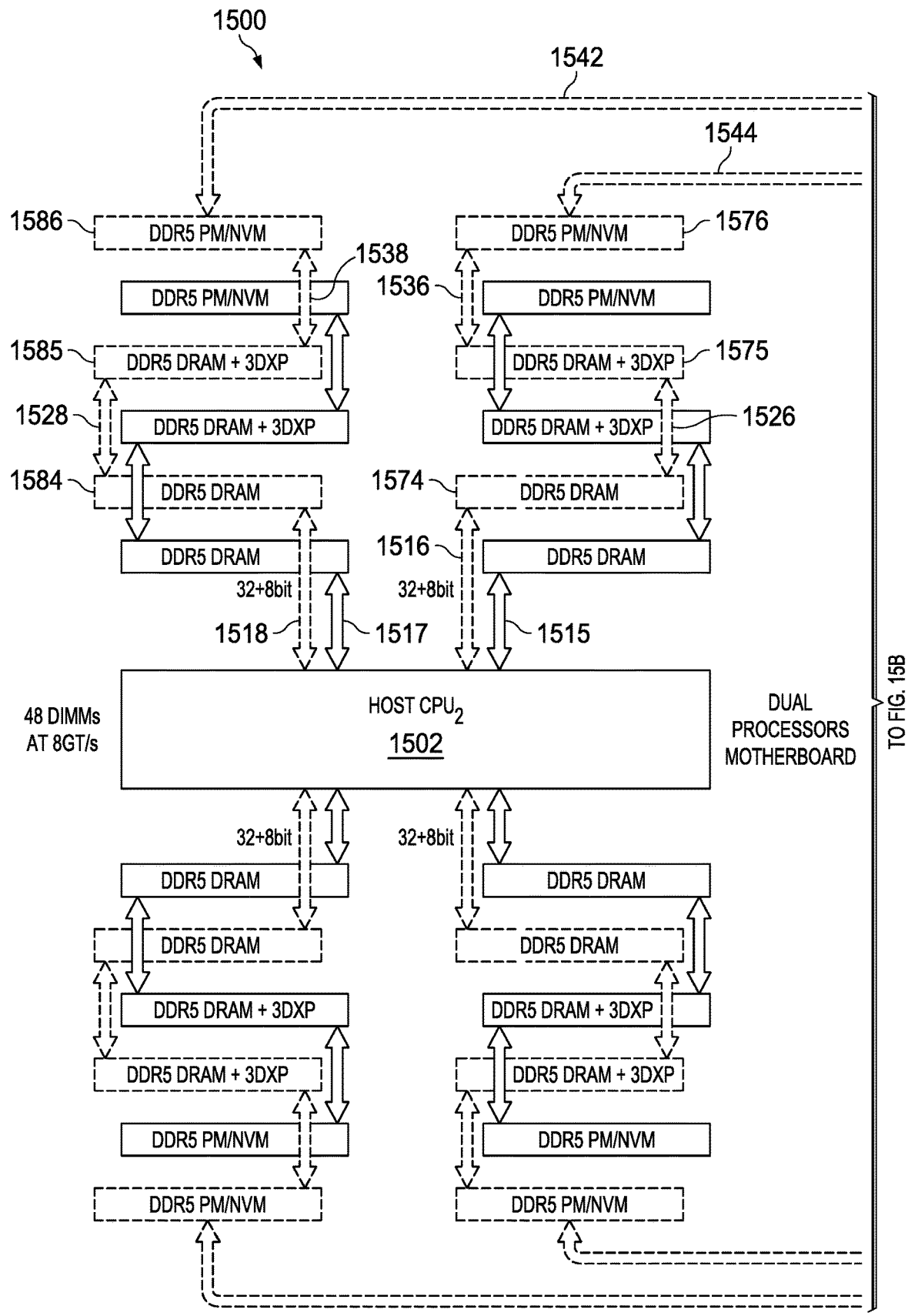
FIGS. 15A and 15B are is block diagrams illustrating DDR5 dual-channel cascading DIMM devices shared by two hosts.
Figure 15B:
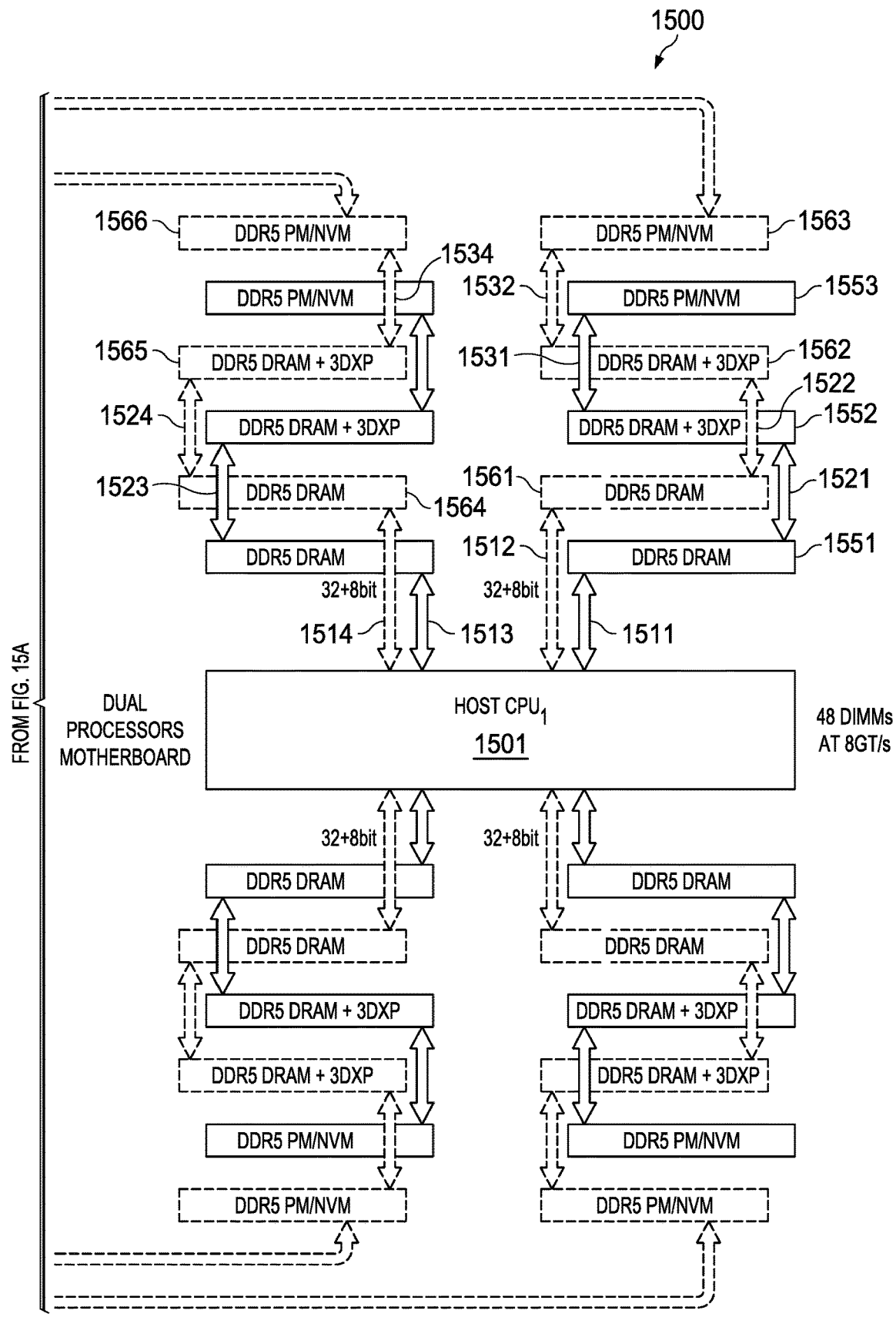

Another embodiment provides cache-coherent sharing of multiple CPUs' memory space without SerDes interconnections. FIGS. 15A and 15B illustrate a dual processor motherboard system 1500 having DDR5 dual-channel cascading DIMM devices shared by two host CPUs. FIGS. 15A and 15B combine features of FIGS. 9, 13, 14A and 14B, while adding multiple processor sharing of the memory. Two host CPUs, host $CPU_1$ 1501 and host $CPU_2$ 1502, are mounted on a dual processor motherboard, along with their shared memory.

Each host CPU 1501, 1502 is coupled to four dual-channel DDR5 buses, with the implementation of each dual-channel DDR5 interface is similar to that shown in FIG. 9. For example, for one of the DDR5 dual-channels, host $CPU_1$ 1501 is coupled to two 40-bit data/ECC DDR5 sub-channels 1511, 1512, which in turn are coupled to DDR5 SDRAM DIMMs 1551, 1561, respectively. Each of the DDR5 SDRAM DIMMs 1551, 1561 is cascaded, via a 40-bit data/ECC sub-channel 1521, 1522, respectively, to a DDR5 SDRAM/3DXP device 1552, 1562, respectively. Each of the DDR5 SDRAM/3DXP devices 1552, 1562 is cascaded, via 40-bit data/ECC sub-channel 1531, 1532, respectively, to a DDR5 SDRAM/PM/NVM device 1553, 1563, respectively.

For another of the DDR5 dual-channels for host CPU1 1501, host CPU1 is coupled to two 40-bit data/ECC DDR5 sub-channels 1513, 1514, which in turn are coupled to respective DDR5 SDRAM DIMMs 1564. Each of the DDR5 SDRAM DIMMs 1564 is cascaded, via a 40-bit data/ECC sub-channel 1523, 1524, respectively, to a DDR5 SDRAM/3DXP device 1565. Each of the DDR5 SDRAM/3DXP devices 1565 is cascaded, via a respective 40-bit data/ECC sub-channel 1534 to a respective DDR5 SDRAM/PM/NVM device 1566. Host CPU1 1501 is coupled to two other cascaded DDR5 dual-channels in a similar manner, as illustrated in FIGS. 15A and 15B.

Host CPU$_2$ 1502 is coupled to its four dual-channel DDR5 interfaces in a similar manner as that of host CPU$_1$ 1501. For one of the DDR5 dual-channels, for example, host CPU$_2$ 1502 is coupled to two 40-bit data/ECC DDR5 sub-channels 1515, 1516, which in turn are coupled to respective DDR5 SDRAM DIMMs 1574. Each of the DDR5 SDRAM DIMMs 1574 is cascaded, via a respective 40-bit data/ECC sub-channel 1526 to a DDR5 SDRAM/3DXP device 1575. Each of the DDR5 SDRAM/3DXP devices 1575 is cascaded, via a respective 40-bit data/ECC sub-channel 1536 to a respective DDR5 SDRAM/PM/NVM device 1576.

For another of the DDR5 dual-channels for host CPU2 1502, host CPU2 is coupled to two 40-bit data/ECC DDR5 sub-channels 1517, 1518, which in turn are coupled to respective DDR5 SDRAM DIMMs 1584. Each of the DDR5 SDRAM DIMMs 1584 is cascaded, via a respective 40-bit data/ECC sub-channel 1528 to a DDR5 SDRAM/3DXP device 1585. Each of the DDR5 SDRAM/3DXP devices 1585 is cascaded, via a respective 40-bit data/ECC sub-channel 1538 to a respective DDR5 SDRAM/PM/NVM device 1586. Host CPU2 1502 is coupled to two other cascaded DDR5 dual-channels in a similar manner, as illustrated in FIGS. 15A and 15B.

For memory sharing, pairs of the host CPU$_1$ 1501 and host CPU$_2$ 1502 cascaded DDR5 dual-channels are coupled to each other via respective synch channels for the PM/NVM. For example, DDR5 SDRAM/PM/NVM device 1563 is coupled to DDR5 SDRAM/PM/NVM device 1586 via synch channel 1542. Similarly, DDR5 SDRAM/PM/NVM device 1566 is coupled to DDR5 SDRAM/PM/NVM device 1576 via synch channel 1544.

Finally, host CPU1 1501 and host CPU2 1502 are each coupled to two other cascaded DDR5 dual-channels, with the respective synchronous channels coupling the PM/NVM memory, as illustrated in FIGS. 15A and 15B. Each host CPU thus has access to 48 DIMMs at an 8 GT/s transaction rate, without the cross-accessing latencies of implementations having SerDes interconnections between CPUs.

Figure 16:
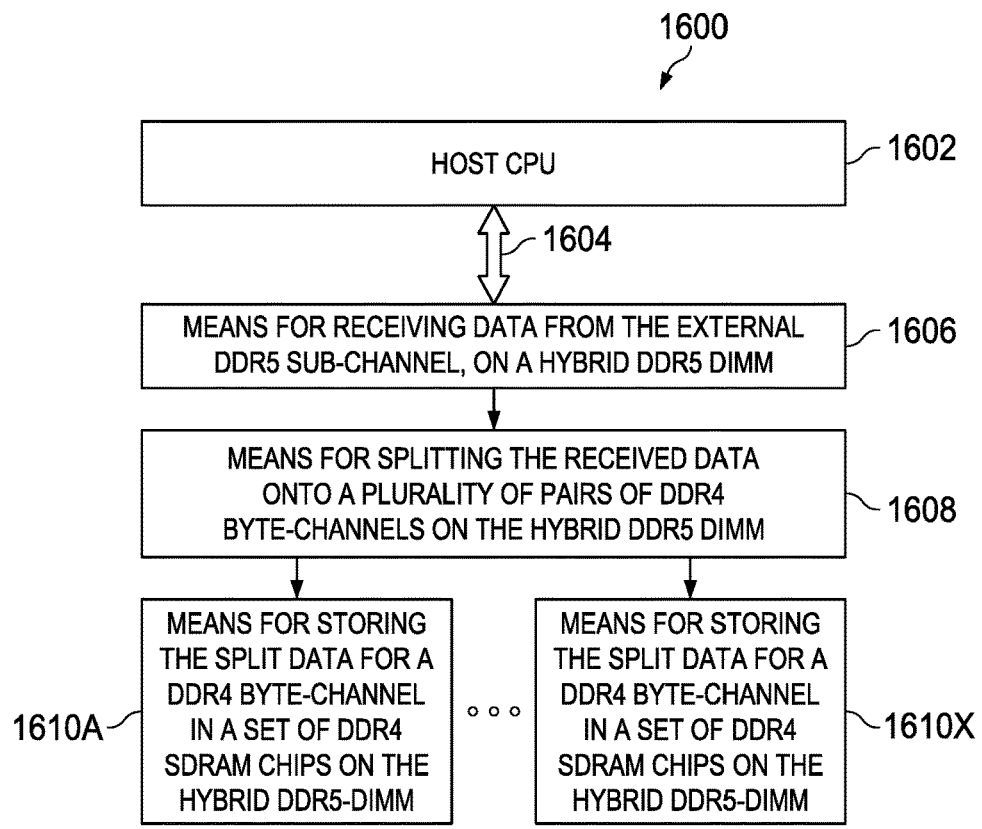
FIG. 16 is a block diagram illustrating an embodiment hybrid DDR5 DIMM system.

It should be appreciated that one or more steps of the embodiment methods provided herein may be performed by corresponding means, units or modules. The respective means/units/modules may be hardware, software, or a combination thereof. For instance, one or more of the means/units/modules may be an integrated circuit, such as field programmable gate arrays (FPGAs) or application-specific integrated circuits (ASICs). As an example, FIG. 16 illustrates a hybrid DDR5 DIMM system 1600. Host CPU 1602 communicates with a hybrid DDR5 DIMM including means 1606 for receiving data from external DDR5 sub-channel 1604. The hybrid DDR5 DIMM also includes means 1608 for splitting the received data onto a plurality of pairs of DDR4 byte-channels. The hybrid DDR5 DIMM also includes means 1610A-1610X for storing the split data for each pair of DDR4 byte-channels in a respective set of DDR4 SDRAM chips on the hybrid ddr5-dimm.

Example 1

A hybrid DDR5 DIMM comprising a PCB; an edge connector of the PCB comprising a DDR5 DIMM external interface for one DDR5 sub-channel; and a plurality of DDR4 SDRAM chips mounted on the PCB and operatively coupled to the DDR5 DIMM external interface.

Example 2

The hybrid DDR5 DIMM of example 1, further comprising a plurality of data-buffer chips mounted on the PCB and operatively coupled between the DDR5 DIMM external interface and the plurality of DDR4 SDRAM chips.

Example 3

The hybrid DDR5 DIMM of any of examples 1-2, wherein each data-buffer is coupled to a respective subset of bits of the DDR5 DIMM external interface; a respective first subset of the plurality of DDR4 SDRAM chips via a first DDR4 byte-channel; and a respective second subset of the plurality of DDR4 SDRAM chips via a second DDR4 byte-channel.

Example 4

The hybrid DDR5 DIMM of any of examples 1-3, wherein the one DDR5 sub-channel has a first transaction rate, and wherein each of the first and second DDR4 byte-channels has a second transaction rate that is half of the first transaction rate.

Example 5

The hybrid DDR5 DIMM of any of examples 1-4, further comprising a RCD mounted on the PCB, and operatively coupled between the DDR5 DIMM external interface and the DDR4 SDRAM chips.

Example 6

The hybrid DDR5 DIMM of any of examples 1-5, wherein the RCD comprises a DDR5-to-DDR4 command/address adaptor.

Example 7

The hybrid DDR5 DIMM of any of examples 1-6, wherein the one DDR5 sub-channel comprises four data bytes and one error correcting code (ECC) byte; and wherein the plurality of DDR4 SDRAM chips is 18 DDR4 SDRAM chips or 36 DDR4 SDRAM chips.

Example 8

The hybrid DDR5 DIMM of any of examples 1-7, further comprising four data data-buffers chips, each data data-buffer chip coupled between a respective one of the four data bytes and a respective subset of eight DDR4 SDRAM chips of the plurality of DDR4 SDRAM chips.

Example 9

The hybrid DDR5 DIMM of any of examples 1-8, wherein each of the four data data-buffer chips is coupled to a first four DDR4 SDRAM chips of the eight DDR4 SDRAM chips via a first DDR4 byte-channel, and coupled to a second four DDR4 SDRAM chips of the eight DDR4 SDRAM chips via a second DDR4 byte-channel.

Example 10

The hybrid DDR5 DIMM of any of examples 1-9, further comprising an ECC data-buffer chip coupled between the ECC byte and a respective subset of four DDR4 SDRAM chips of the plurality of DDR4 SDRAM chips.

Example 11

The hybrid DDR5 DIMM of any of examples 1-10, wherein the ECC data-buffer chip is coupled to the respective subset of four DDR4 SDRAM chips via a DDR4 byte-channel.

Example 12

A processing system comprising a host CPU; a first hybrid DDR5 DIMM comprising a first plurality of DDR4 SDRAM chips; a second hybrid DDR5 DIMM comprising a second plurality of DDR4 SDRAM chips; a first DDR5 sub-channel coupled between the host CPU and the first hybrid DDR5 DIMM; and a second DDR5 sub-channel coupled between the host CPU and the second hybrid DDR5 DIMM.

Example 13

The processing system of example 12, wherein the first DDR5 sub-channel comprises first 32-bits of data and first 8-bits of ECC; and wherein the second DDR5 sub-channel comprises second 32-bits of data and second 8-bits of ECC.

Example 14

The processing system of any of examples 12-13, further comprising a motherboard, wherein the host CPU is mounted on the motherboard; and the first and second DDR5 sub-channels comprise traces on the motherboard coupled to the host CPU.

Example 15

The processing system of any of examples 12-14, further comprising a first edge socket mounted on the motherboard and coupled to the first DDR5 sub-channel, wherein a first edge connector of the first hybrid DDR5 DIMM is inserted into the first edge socket; and a second edge socket mounted on the motherboard and coupled to the second DDR5 sub-channel, wherein a second edge connector of the second hybrid DDR5 DIMM is inserted into the second edge socket.

Example 16

The processing system of any of examples 12-15, further comprising a third hybrid DDR5 DIMM comprising a third plurality of DDR4 SDRAM chips, and coupled to the first DDR5 sub-channel in parallel with the first hybrid DDR5 DIMM; and a fourth hybrid DDR5 DIMM comprising a fourth plurality of DDR4 SDRAM chips, and coupled to the second DDR5 sub-channel in parallel with the second hybrid DDR5 DIMM.

Example 17

The processing system of any of examples 12-16, wherein each of the first and second DDR5 sub-channels is a 6400 MT/s channel.

Example 18

The processing system of any of examples 12-17, further comprising a first DDR5 command/address interface coupled between the host CPU and the first hybrid DDR5 DIMM; and a second DDR5 command/address interface coupled between the host CPU and the second hybrid DDR5 DIMM.

Example 19

The processing system of any of examples 12-18, further comprising a first group of four hybrid DDR5 DIMMs, including the first hybrid DDR5 DIMM, coupled in parallel to the first DDR5 sub-channel; and a second group of four hybrid DDR5 DIMMs, including the second hybrid DDR5 DIMM, coupled in parallel to the second DDR5 sub-channel.

Example 20

The processing system of any of examples 12-19, wherein each of the first and second DDR5 sub-channels is a greater than 4000 MT/s channel.

Example 21

The processing system of any of examples 12-20, wherein each of the first and second hybrid DDR5 DIMMs has 36 DDR4 SDRAM chips.

Example 22

A method of operating a memory system, the method comprising receiving, by a hybrid DDR5 DIMM, data via a first external DDR5 sub-channel; splitting, on the hybrid DDR5-DIMM, the received data onto a plurality of pairs of DDR4 byte-channels; and for each of the DDR4 byte-channels, storing the split data in a set of DDR4 SDRAM chips on the hybrid DDR5-DIMM.

Example 23

The method of example 22, wherein, for each pair of DDR4 byte-channels, the splitting further comprises interleaving the split data between two DDR4 byte-channels in the pair of DDR4 byte-channels.

Example 24

The method of any of examples 22-23, wherein each set of DDR4 SDRAM chips comprises four DDR4 SDRAM chips, and wherein the storing further comprises accessing the DDR4 SDRAM chips as a four-rank memory.

Example 25

The method of any of examples 22-24, further comprising operating the first external DDR5 sub-channel at a first transaction rate; and operating each of the DDR4 byte-channels at a second transaction rate that is half of the first transaction rate.

Example 26

The method of any of examples 22-25, wherein the first transaction rate is 6400 MT/s, and the second transaction rate is 3200 MT/s.

Example 27

The method of any of examples 22-26, wherein the DDR5 sub-channel comprises four data bytes, and wherein the splitting is performed by four data-buffers on the hybrid DDR5-DIMM, each data-buffer coupled between a respective data byte of the DDR5 sub-channel and a respective pair of the DDR4 byte-channels.

Example 28

The method of any of examples 22-27, further comprising receiving ECC data via the first external DDR5 sub-channel; splitting, by an ECC data-buffer on the hybrid DDR5-DIMM, the ECC data to a pair of ECC DDR4 ports; driving the split ECC data from one of the ECC DDR4 ports on an ECC DDR4 byte-channel; and storing the split ECC data in another set of DDR4 SDRAM chips on the hybrid DDR5-DIMM.

Example 29

The method of any of examples 22-28, further comprising receiving DDR5 commands/addresses via a first external DDR5 control-channel; latching, by a special register clock driver (RCD) on the hybrid DDR5 DIMM, the DDR5 commands/addresses; converting, by the special RCD, the latched DDR5 commands/addresses into DDR4 SDRAM commands/addresses; and providing the DDR4 SDRAM commands/addresses to all of the DDR4 SDRAM chips via an SDR control bus operating at a slower speed than the first external DDR5 control-channel.

Example 30

A method of cascading a DDR5 dual-channel system to access more devices for maximum or beyond speeds, the method comprising transferring first data via a first DDR5 sub-channel at a first transaction rate to a first hybrid DDR5 DIMM comprising a first plurality of DDR4 or slow DDR5 SDRAM chips; and transferring second data via a second DDR5 sub-channel at the first transaction rate to a second hybrid DDR5 DIMM comprising a second plurality of DDR4 or slow DDR5 SDRAM chips.

Example 31

The method of example 30, further comprising, on each of the first and second hybrid DDR5 DIMMS receiving the respective data; splitting the received data onto a plurality of pairs of byte-channels having a slow second transaction rate; and for each of the byte-channels, storing the split data in a subset of the respective DDR4 or slow DDR5 SDRAM chips.

Example 32

The method of any of examples 30-31, wherein the splitting further comprises, for each pair of byte-channels, interleaving the split data between two byte-channels depending on a falling edge or a rising edge of the DQS strobe signals.

Example 33

The method of any of examples 30-32, wherein the second transaction rate is half of the first transaction rate or little bit high rate.

Example 34

The method of any of examples 30-33, wherein the storing further comprises accessing the subset of respective DDR4 or slow DDR5 SDRAM chips as a four-rank DIMM device.

Example 35

The method of any of examples 30-34, further comprising transferring third data via the first DDR5 sub-channel at the first transaction rate to a third hybrid DDR5 DIMM comprising a third plurality of DDR4 SDRAM chips; and transferring fourth data via the second DDR5 sub-channel at the first transaction rate to a fourth hybrid DDR5 DIMM comprising a fourth plurality of DDR4 SDRAM chips, through unused DDR5 sub-channels as cascading ports of cascading-switched data buffer chips.

Example 36

The method of any of examples 30-35, wherein the first transaction rate is 6400 MT/s and the second transaction rate is 3200 MT/s to access the DDR4 SDRAM chips, or 8000 MT/s to access 4000 MT/s DDR5 SDRAM chips to double speed and chip numbers.

Example 37

The method of any of examples 30-36, further comprising transferring first ECC data via the first DDR5 sub-channel at the first transaction rate to the first hybrid DDR5 DIMM; and transferring second ECC data via the second DDR5 sub-channel at the first transaction rate to the second hybrid DDR5 DIMM.

Example 38

The method of any of examples 30-37, further comprising sending first DDR5 commands/addresses via the first DDR5 sub-channel to the first hybrid DDR5 DIMM; and sending second DDR5 commands/addresses via the second DDR5 sub-channel to the second hybrid DDR5 DIMM.

Example 39

The method of any of examples 30-38, further comprising converting, by a first RCD on the first hybrid DDR5 DIMM, the first DDR5 commands/addresses to first DDR4 SDRAM commands/addresses; providing the first DDR4 SDRAM commands/addresses to the first plurality of DDR4 SDRAM chips; converting, by a second RCD on the second hybrid DDR5 DIMM, the second DDR5 commands/addresses to second DDR4 SDRAM commands/addresses; providing the second DDR4 SDRAM commands/addresses to the second plurality of DDR4 SDRAM chips; and regenerating consecutive DDR4 burst access command addresses to adapt DDR5 burst 32 (BL32) as two DDR4 bursts (2 BL8) accesses.

Example 40

A method of manufacturing a hybrid DDR5 DIMM comprising a DDR5 DIMM external interface for one DDR5 sub-channel on an edge connector of a PCB, the method comprising mounting a plurality of data-buffer chips on the PCB, the plurality of data-buffer chips operatively coupled to the DDR5 DIMM external interface; mounting a plurality of DDR4 SDRAM chips on the PCB, the plurality of DDR4 SDRAM chips operatively coupled to the data-buffer chips; and mounting a RCD on the PCB, the RCD operatively coupled between the DDR5 DIMM external interface and the plurality of DDR4 SDRAM chips.

Embodiments may be implemented in systems benefiting from high-performance next-generation memories. For example, embodiments may be used with system on a chip (SoC) chips, application-specific integrated circuits (ASICs), and the like. Embodiments may be implemented in computer servers, data center equipment, big data computing and storage, cloud computing and cloud storage, high speed equipment, and the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A hybrid double data rate 5 (DDR5) dual inline memory module (DIMM) comprising:
   a printed circuit board (PCB);
   an edge connector of the PCB comprising a solitary DIMM external host interface, wherein the solitary DIMM external host interface is for only one DDR5 sub-channel;
   a plurality of DDR4 synchronous dynamic random access memory (SDRAM) chips mounted on the PCB and operatively coupled to the solitary DIMM external host interface; and
   a plurality of data-buffer chips and a registered clock driver (RCD) chip mounted on the PCB.

2. The hybrid DDR5 DIMM of claim 1, further comprising each of the plurality of data-buffer chips operatively coupled between the solitary DIMM external host interface and two subsets of the plurality of DDR4 SDRAM chips as a 1-to-2 byte-channel splitting and speed-rate doubling application-specific integrated circuit (ASIC) chip to fan-out to the two subsets of the plurality of DDR4 SDRAM chips.

3. The hybrid DDR5 DIMM of claim 2, wherein the one DDR5 sub-channel at each data-buffer chip has a first host interface rate, and wherein DDR4 byte-channels between each data-buffer chip and respective subsets of the plurality of DDR4 SDRAM chips each has a second memory interface rate that is half of the first host interface rate.

4. The hybrid DDR5 DIMM of claim 2, further comprising the RCD chip operatively coupled between the solitary DIMM external interface and the plurality of DDR4 SDRAM chips, as a DDR5-to-DDR4 command and address adaptor.

5. The hybrid DDR5 DIMM of claim 1,
   wherein the one DDR5 sub-channel comprises four host data bytes and one error correcting code (ECC) byte; and
   wherein the plurality of DDR4 SDRAM chips is 18 DDR4 SDRAM chips or 36 DDR4 SDRAM chips, with two or four DDR4 SDRAM chips for ECC, respectively.

6. The hybrid DDR5 DIMM of claim 5, further comprising:
   four data data-buffers chips, each data-buffer chip coupled between a respective one of the four host data bytes and a respective subset of eight DDR4 byte-channels then the plurality of DDR4 SDRAM chips, and one data-buffer chip for a ECC byte-channel, to fit 4-bytes data and 1-byte ECC host interface into 8-bytes data and 1-byte ECC memory interface, wherein a speed rate of each DDR4 byte-channel is half of a speed rate of the solitary DIMM external host interface.

7. A processing system comprising:
   a host central processing unit (CPU);
   one or more pairs of hybrid double data rate 5 (DDR5) dual inline memory modules (DIMMs) configured as:
      a first hybrid DDR5-DIMM comprising a first plurality of DDR4 SDRAM chips;
      a second hybrid DDR5 DIMM comprising a second plurality of DDR4 SDRAM chips;
      a solitary first memory channel coupled between the host CPU and the first hybrid DDR5 DIMM, the solitary first memory channel being a first DDR5 sub-channel; and
      a solitary second memory channel coupled between the host CPU and the second hybrid DDR5 DIMM, the solitary second memory channel being a second DDR5 sub-channel; and
   a motherboard interconnecting the host CPU with one pair of the hybrid DDR5 DIMMs at high speed, or two pairs of the hybrid DDR5 DIMMs at slow speed to access 4× memory capacities.

8. The processing system of claim 7,
   wherein the first DDR5 sub-channel comprises first 32-bits of data and first 8-bits of error correcting code (ECC); and
   wherein the second DDR5 sub-channel comprises second 32-bits of data and second 8-bits of ECC.

9. The processing system of claim 7, further comprising a DDR5 command and address interface from the host CPU to drive the one or more pairs of hybrid DDR5 DIMMs, as the first hybrid DDR5 DIMM and the second hybrid DDR5 DIMM.

10. The processing system of claim 7, further comprising:
    a first group of four hybrid DDR5 DIMMs, including the first hybrid DDR5 DIMM, coupled in parallel to the first DDR5 sub-channel; and
    a second group of four hybrid DDR5 DIMMs, including the second hybrid DDR5 DIMM, coupled in parallel to the second DDR5 sub-channel.

11. The processing system of claim 7, wherein each of the first and second DDR5 sub-channels is a greater than 4400 MT/s channel for accessing one pair of the hybrid DDR5 DIMMs, or slower for accessing two pairs of the hybrid DDR5 DIMMs as 4DPC capacities.

12. The processing system of claim 7, wherein each of the first and second hybrid DDR5 DIMMs supports 18 or 36 DDR4 SDRAM chips in a currently-available DDR4 DIMM form factor.

13. A method of operating a memory system, the method comprising:
receiving, by a hybrid double data rate 5 (DDR5)-dual inline memory module (DIMM), data via a solitary external memory channel for the hybrid DDR5-DIMM, the solitary external memory channel being an external DDR5 sub-channel;
splitting, on the hybrid DDR5-DIMM, the received data onto a plurality of pairs of DDR4 byte-channels; and
for each of the DDR4 byte-channels, storing the split data in a set of DDR4 synchronous dynamic random access memory (SDRAM) chips on the hybrid DDR5-DIMM.

14. The method of claim 13, wherein, for each pair of DDR4 byte-channels, the splitting further comprises interleaving the split data between two DDR4 byte-channels in the pair of DDR4 byte-channels.

15. The method of claim 14, wherein each set of DDR4 SDRAM chips comprises four DDR4 SDRAM chips, and wherein the storing further comprises accessing the DDR4 SDRAM chips as a four-rank memory.

16. The method of claim 13, further comprising:
operating the external DDR5 sub-channel at a first transaction rate; and
operating each of the DDR4 byte-channels at a second transaction rate that is half of the first transaction rate.

17. The method of claim 16, wherein the first transaction rate is 6400 mega-transactions per second (MT/s), and the second transaction rate is 3200 MT/s.

18. The method of claim 13, wherein the external DDR5 sub-channel comprises four data bytes, and wherein the splitting is performed by four data-buffers on the hybrid DDR5-DIMM, each data-buffer coupled between a respective data byte of the external DDR5 sub-channel and a respective pair of the DDR4 byte-channels.

19. The method of claim 13, further comprising:
receiving error correcting code (ECC) data via the external DDR5 sub-channel;
splitting, by an ECC data-buffer on the hybrid DDR5-DIMM, the ECC data to a pair of ECC DDR4 ports;
driving the split ECC data from one of the ECC DDR4 ports on an ECC DDR4 byte-channel; and
storing the split ECC data in another set of DDR4 SDRAM chips on the hybrid DDR5-DIMM.

20. The method of claim 13, further comprising:
receiving DDR5 commands and addresses via an external DDR5 control-channel;
latching, by a register clock driver (RCD) on the hybrid DDR5-DIMM, the DDR5 commands and addresses;
converting, by the RCD, the latched DDR5 commands and addresses into DDR4 SDRAM commands and addresses; and
providing the DDR4 SDRAM commands and addresses to all of the DDR4 SDRAM chips via a single data rate (SDR) control bus operating at half of an SDR speed of the external DDR5 control-channel.

21. A method of cascading a double data rate 5 (DDR5) dual-channel system, the method comprising:
transferring first data via a first DDR5 sub-channel at a first host interface rate to a first hybrid DDR5 dual inline memory module (DIMM) comprising a first plurality of DDR4 synchronous dynamic random access memory (SDRAM) chips and only one first external memory channel interface, the first external memory channel interface being a first DDR5 sub-channel interface; and
transferring second data via a second DDR5 sub-channel at the first host interface rate to a second hybrid DDR5 DIMM comprising a second plurality of DDR4 SDRAM chips and only one second external memory channel interface, the second external memory channel interface being a second external DDR5 sub-channel interface.

22. The method of claim 21, further comprising, on each of the first and second hybrid DDR5 DIMMS:
receiving the first or second data, respectively;
splitting the received first or second data onto a plurality of pairs of byte-channels having a slow second memory interface rate; and
for each of the byte-channels, storing the split first or second data in a respective subset of the DDR4 SDRAM chips.

23. The method of claim 22, wherein the splitting further comprises, for each pair of byte-channels, interleaving the split first or second data between two byte-channels depending on a falling edge or a rising edge of DQS strobe signals.

24. The method of claim 22, wherein the slow second memory interface rate is half of the first host interface rate for driving up to 4 slow SDRAM chips.

25. The method of claim 22, wherein the storing further comprises accessing the respective subset of the DDR4 SDRAM chips as a four-rank DIMM device.

26. The method of claim 22, further comprising:
transferring third data via the first DDR5 sub-channel at the first host interface rate to a third hybrid DDR5 DIMM comprising a third plurality of DDR4 SDRAM chips; and
transferring fourth data via the second DDR5 sub-channel at the first host interface rate to a fourth hybrid DDR5 DIMM comprising a fourth plurality of DDR4 SDRAM chips, through unused DDR5 sub-channels as cascading ports of cascading-switched data buffer chips.

27. The method of claim 26, wherein the first host interface rate is 6400 mega-transactions per second (MT/s) and the slow second memory interface rate is 3200 MT/s to access the DDR4 SDRAM chips for doubling DDR4 speed.

28. The method of claim 21, further comprising:
transferring first error correcting code (ECC) data via the first DDR5 sub-channel at the first host interface rate to the first hybrid DDR5 DIMM; and
transferring second ECC data via the second DDR5 sub-channel at the first host interface rate to the second hybrid DDR5 DIMM.

29. The method of claim 21, further comprising:
sending first DDR5 commands and addresses via the first DDR5 sub-channel to the first hybrid DDR5 DIMM; and
sending second DDR5 commands and addresses via the second DDR5 sub-channel to the second hybrid DDR5 DIMM.

30. The method of claim 29, further comprising:
converting, by a first register clock driver (RCD) on the first hybrid DDR5 DIMM, the first DDR5 commands and addresses to first DDR4 SDRAM commands and addresses;
providing the first DDR4 SDRAM commands and addresses to the first plurality of DDR4 SDRAM chips;
converting, by a second RCD on the second hybrid DDR5 DIMM, the second DDR5 commands and addresses to second DDR4 SDRAM commands and addresses;
providing the second DDR4 SDRAM commands and addresses to the second plurality of DDR4 SDRAM chips; and regenerating consecutive DDR4 burst access command addresses to adapt DDR5 burst 32 (BL32) as two DDR4 bursts (2 BL8) cross-bank or cross-rank accesses.

* * * * *